INVENTOR
GERALD J. BADGLEY

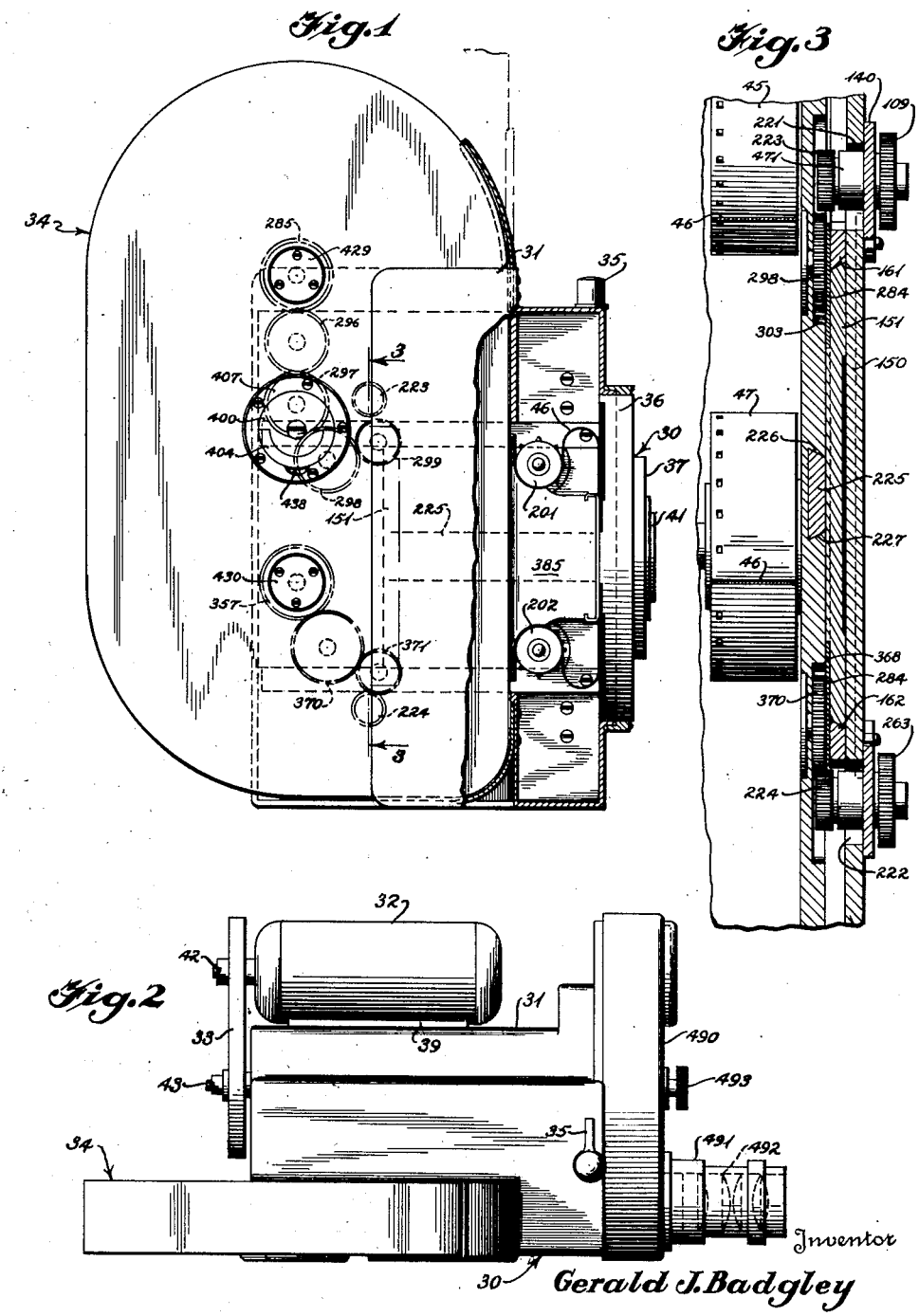

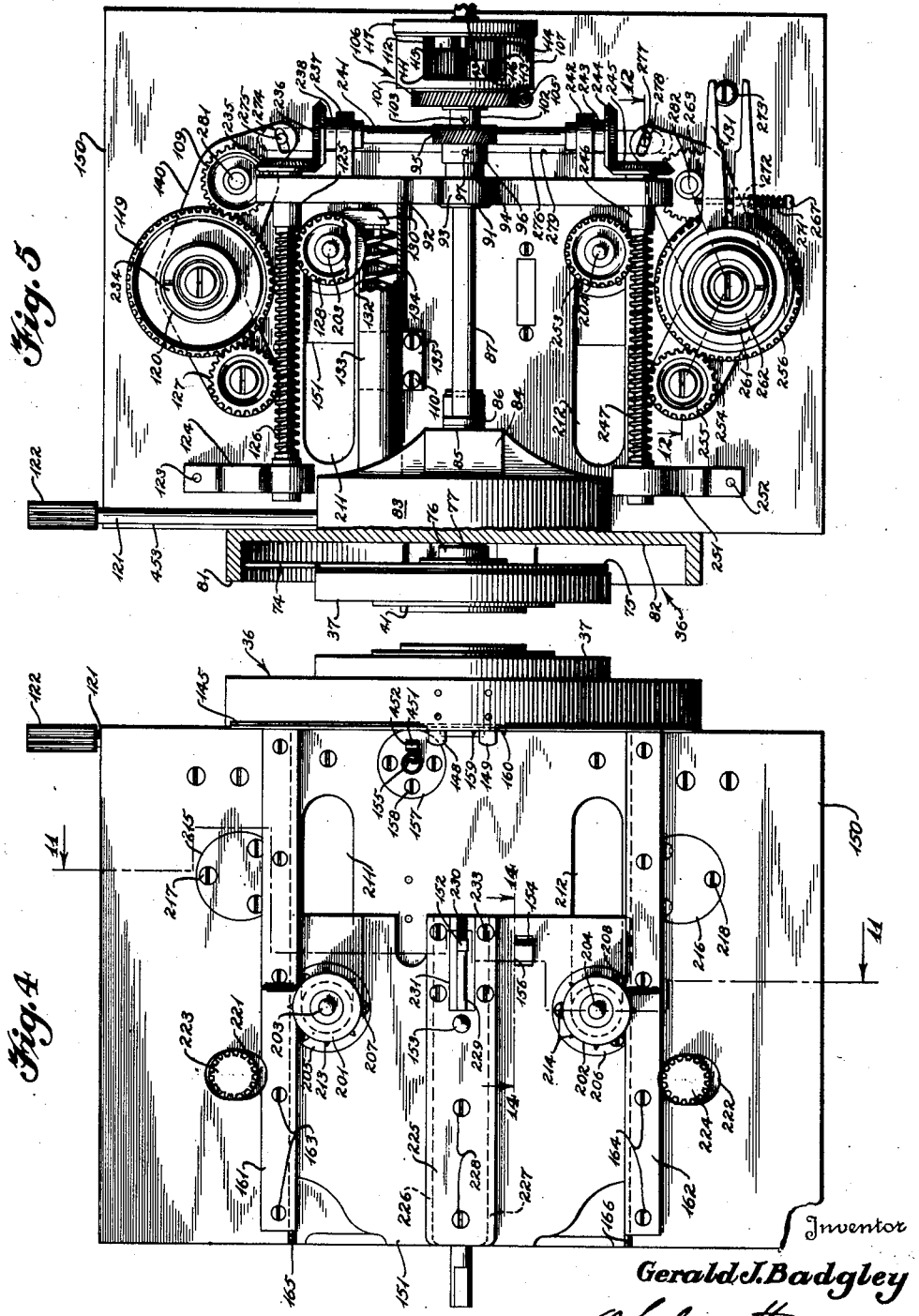

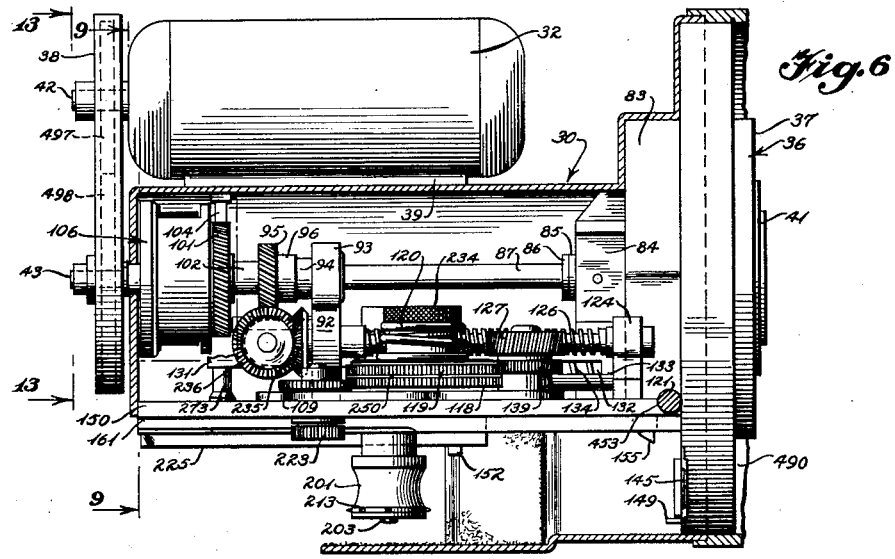
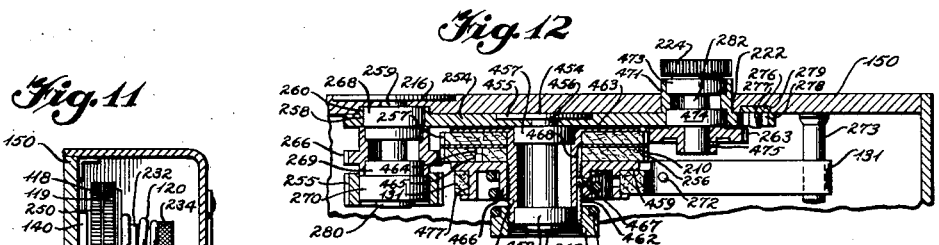
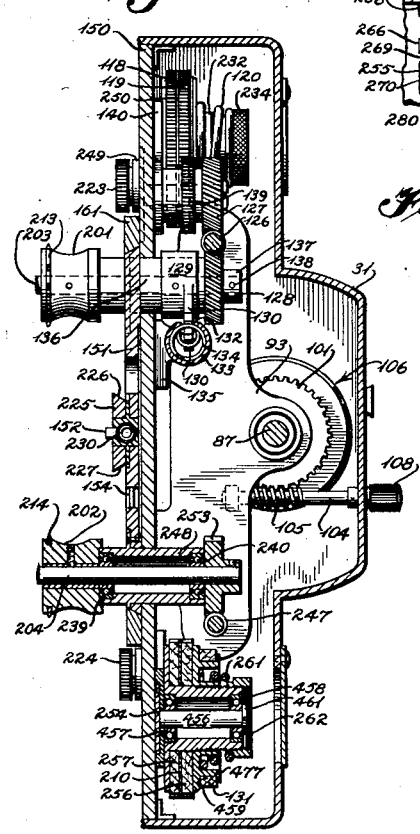
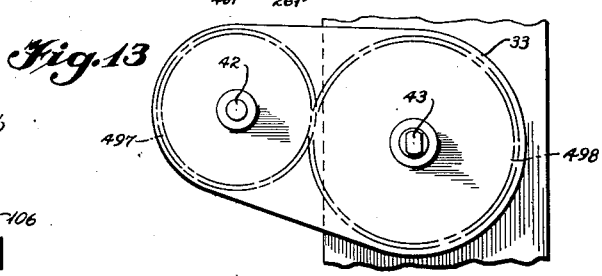
Inventor
Gerald J. Badgley
Attorneys

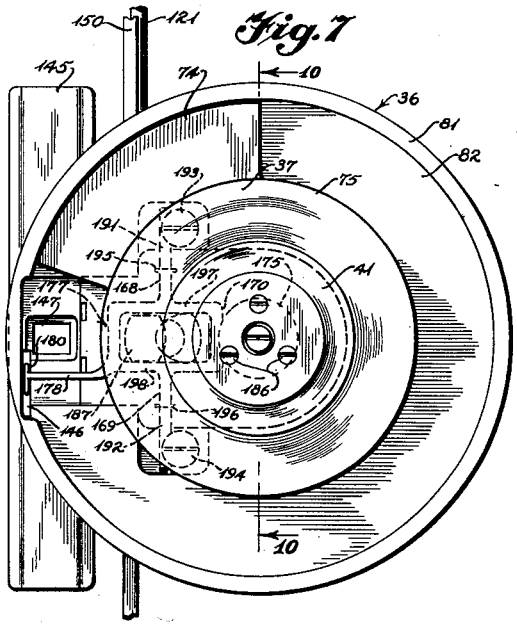

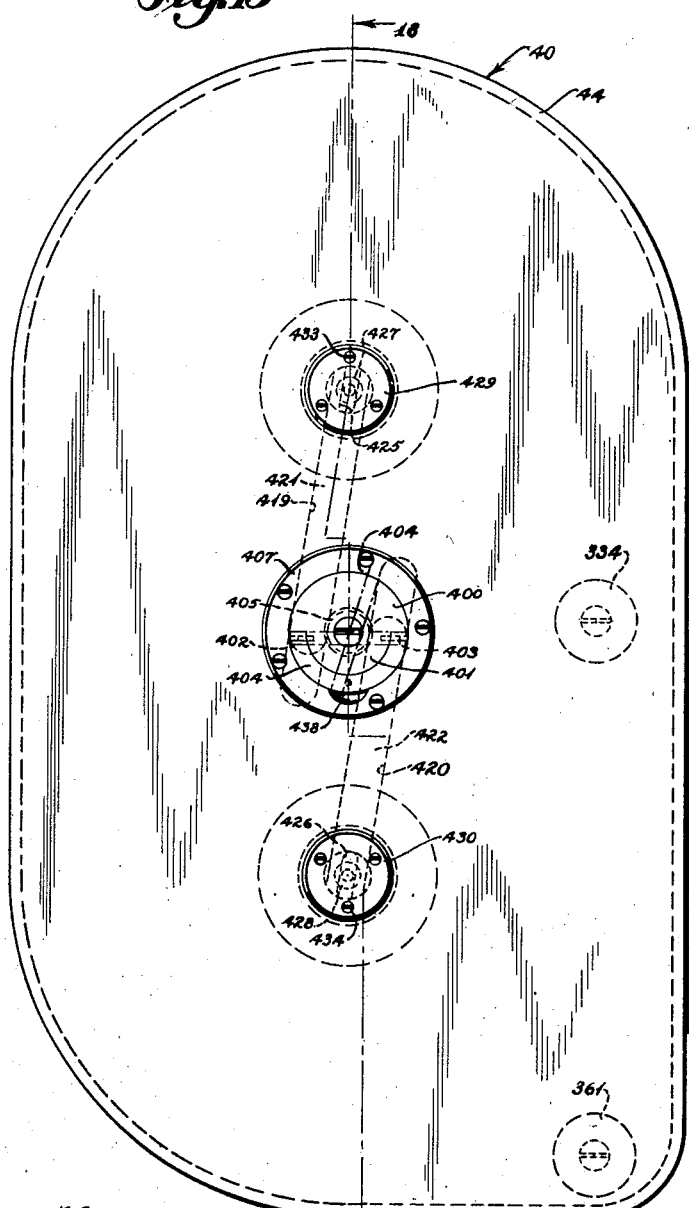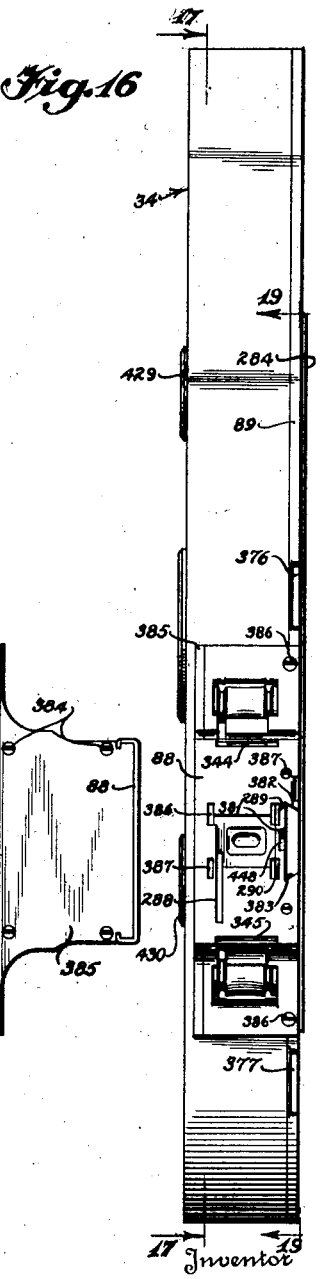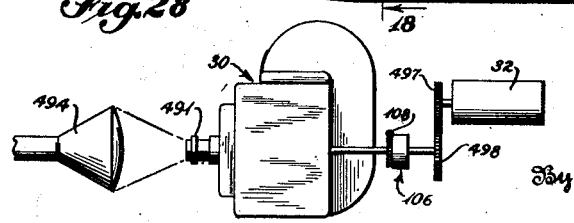

Sept. 24, 1957                G. J. BADGLEY                2,807,188
              MOTION PICTURE APPARATUS HAVING FILM
                   MAGAZINE AND LOOP FORMING MEANS
Original Filed April 21, 1950                         11 Sheets-Sheet 7

Inventor
Gerald J. Badgley

Sept. 24, 1957 G. J. BADGLEY 2,807,188
MOTION PICTURE APPARATUS HAVING FILM
MAGAZINE AND LOOP FORMING MEANS
Original Filed April 21, 1950 11 Sheets-Sheet 8
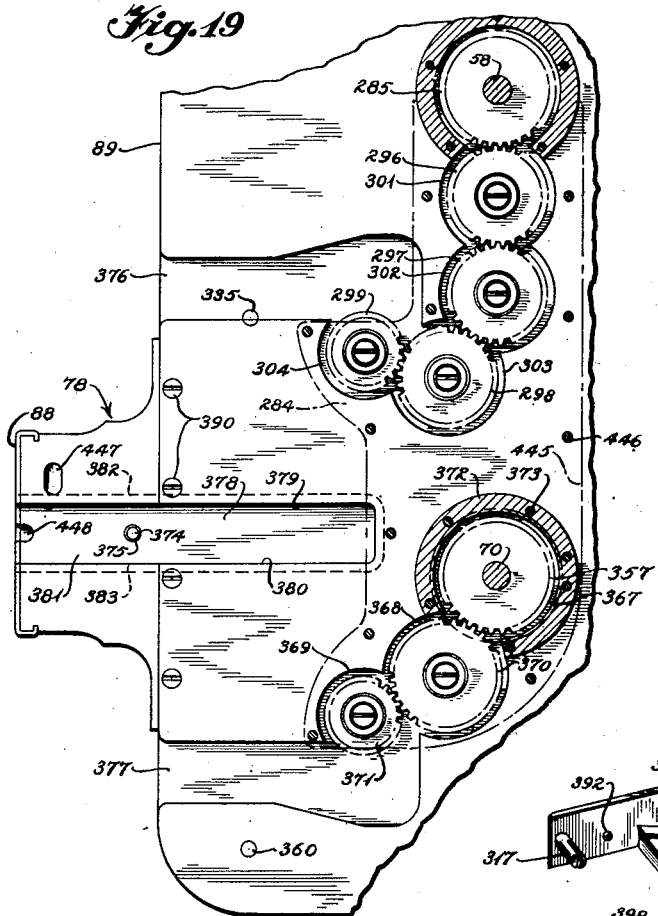
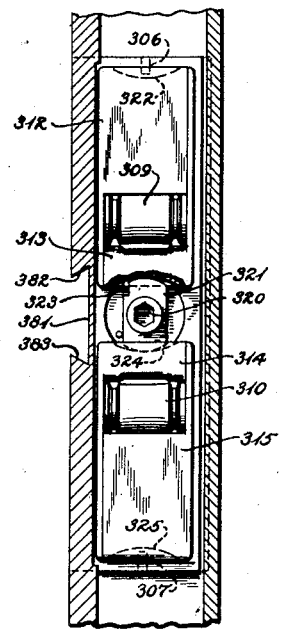
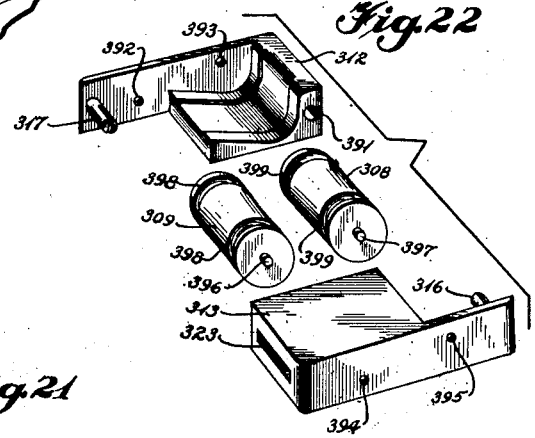
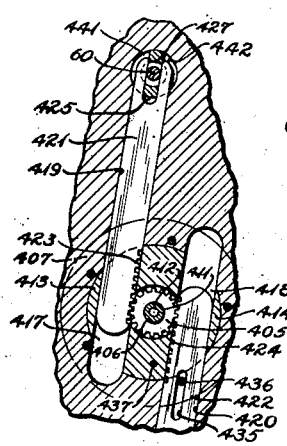
Inventor
Gerald J. Badgley Sept. 24, 1957 G. J. BADGLEY 2,807,188
MOTION PICTURE APPARATUS HAVING FILM
MAGAZINE AND LOOP FORMING MEANS
Original Filed April 21, 1950 11 Sheets-Sheet 9

INVENTOR
GERALD J. BADGLEY

BY
ATTORNEYS

Sept. 24, 1957　　　　　G. J. BADGLEY　　　　　2,807,188
MOTION PICTURE APPARATUS HAVING FILM
MAGAZINE AND LOOP FORMING MEANS
Original Filed April 21, 1950　　　　　　　11 Sheets-Sheet 11

INVENTOR
GERALD J. BADGLEY

BY

ATTORNEYS

United States Patent Office 2,807,188
Patented Sept. 24, 1957

2,807,188

MOTION PICTURE APPARATUS HAVING FILM MAGAZINE AND LOOP FORMING MEANS

Gerald J. Badgley, District Heights, Md.

Continuation of abandoned application Serial No. 157,392, April 21, 1950. This application January 13, 1954, Serial No. 403,944

26 Claims. (Cl. 88—17)

(Granted under Title 35, U. S. Code (1952), sec. 266)

This invention relates to motion picture apparatus, and is a continuation of application Serial No. 157,392 filed April 21, 1950, now abandoned.

More specifically this invention discloses an arrangement for automatically forming loops in the film carried by a magazine as the magazine is inserted into the motion picture apparatus. This invention also discloses an arrangement for reversibly driving the motion picture apparatus solely by reversing the direction of rotation of the drive means without the use of additional manually operable controls. The invention further discloses an arrangement whereby the motion picture apparatus shutter and the film feed mechanism are driven directly from the same main power shaft of the apparatus. The invention further discloses a stabilizer arrangement for the shutter, which in combination with the features of driving the film feed mechanism and the shutter from the same main power shaft of the apparatus, provides smoother and more precise operation of the apparatus. The invention further discloses a synchronizer which is coupled to the apparatus for the purpose of synchronizing the shutter of the apparatus with a television image when the motion picture apparatus is used for photographing television images.

Relative to the automatic loop forming feature of the apparatus, prior art motion picture apparatus of the magazine loading type are characterized by a number of disadvantages. In devices of the type in which the magazine has been loaded and sealed at the factory, while automatic loading is provided for in the camera apparatus, it is found that the film capacity is usually limited, for example to 50 feet of film. These magazines are frequently cheaply constructed and are subject to frequent malfunctioning in spite the fact that they are expensive to manufacture.

In other types of prior art devices, the film end must first be inserted into the camera, and then after a foot or so of film has passed through the camera, the film end must be attached to the take-up spool. Such devices are not completely automatic; the magazine, if any, cannot be removed from the camera, and day-light loading spools must be used unless the camera is loaded in the darkroom.

The apparatus disclosed by the instant invention provides for automatic rotation of the film feed sprockets during the operation of attaching a preloaded film magazine to the remainder of the apparatus, for the purpose of forming loops in the film. Subsequent to the loading of the camera, these sprockets aid in maintaining the loops of a proper size to facilitate the passage of the film past the exposure aperture of the apparatus and further serve to feed the film to and from the reeling mechanism at a proper rate of speed. Preloaded magazines containing any film size or length may be used. A magazine with a portion of the film exposed may be quickly removed from the camera and a new magazine with a different type of film substituted. Threading errors are completely eliminated as the film is automatically threaded into the camera in such a manner as to always produce the optimum length of film loops.

The apparatus embodying the instant invention is particularly suitable for use under combat conditions, where quick loading and reloading is required, and is especially useful under cold weather conditions, because of the fact that no delicate manual operations are required in the full use of the apparatus.

Prior art reversible motion picture apparatus have utilized reversible clutch means no other controls in addition to the drive means for the purpose of reversing the feed of the apparatus when required. However the instant invention discloses an arrangement for reversing the direction of feed of the apparatus by merely reversing the direction of rotation of the drive means.

In prior art motion picture apparatus which is used for kinerecording television images according to the method disclosed in U. S. Patent 2,251,786 separate motors must be used to drive the film feeding mechanism and the shutter mechanism in order to eliminate the characteristic in the picture known as shutter banding. This banding is the formation of a line in the photograph which is caused by improper optical splicing due to the fluctuation in speed of the shutter which is caused when the pull down of the film is performed when only one motor is used to drive both the shutter and the film feed mechanism. However, one disadvantage of using two motors is that intricate electrical coupling means must be employed between the two motors in order to synchronize the two motors. Another disadvantage is the fact that a plurality of motors causes the apparatus to be heavy and cumbersome and usually precludes the use of a multiple turret lens mounting. However, the instant invention discloses an arrangement whereby one drive motor is utilized to drive both the shutter and the film feeding means without the aforementioned disadvantages which were prevalent in the prior art. One motor can be used because the shutter is stabilized in a sense to be more fully described hereafter and because the film feeding mechanism is the type which operates at a constant speed but intermittently engages the film.

In prior art devices the shutter mechanism was not stabilized, in the sense to be explained more fully hereafter. However the instant invention discloses how the shutter of the motion picture apparatus may be stabilized. When this stabilization is used in conjunction with the features of driving the film feed mechanism and the shutter from the main power shaft of the apparatus, more precise operation of the motion picture apparatus is attained. Not only does this smoother operation aid in obtaining a better finished product, whether an image on the film or a projection thereof, but also is vital in providing a more accurate kinerecording when the apparatus is used as a camera for the purpose of recording television images, as described above.

The instant invention also discloses a synchronizer which can be coupled to the apparatus for the purpose of synchronizing the shutter of the apparatus with a television image when the apparatus is used for kinerecording. More specifically, the synchronizer is used to position a line, which is formed by virtue of the optical splicing encountered when the television transmission of 30 frames per second is photographed at 24 frames per second, in a non-critical portion of the picture. It can be seen that this procedure enhances the quality of the finished reproduction in the sense that the line thus formed will not detract from the main portion of the picture.

It is to be noted that certain aspects of the motion picture apparatus disclosed by the instant invention is capable of use in both cameras and projectors and that the apparatus is limited only by the scope of the appended claims.

Accordingly, it is an object of the invention to provide new and improved motion picture apparatus.

Another object is to provide new and improved motion picture apparatus having automatic means for forming film loops of the desired size.

Another object is to provide new and improved motion picture apparatus characterized by simplicity of loading.

Another object is to provide new and improved motion picture apparatus of the magazine type in which magazine insertion results in automatic threading of the film.

Another object is to provide new and improved motion picture apparatus having means for automatically forming film loops of uniform length.

Still another object of the invention is to provide new and improved motion picture apparatus of the magazine type in which the operations of insertion and replacement of the magazine may be accomplished in a fraction of the time required by prior art devices.

A further object is to provide new and improved automatic film threading and loop forming apparatus for use in motion picture devices.

Another obect of the instant invention is to disclose an arrangement for selectively driving either of the reels of the motion picture apparatus by merely reversing the drive means of the apparatus.

Another object of the invention is to disclose a gearing arrangement for driving the motion picture apparatus shutter and the film feeding mechanism directly from the main drive shaft of the apparatus. In this manner unnecessary play between the parts is eliminated and more accurate operation is insured.

It is a further object of this invention to disclose a shutter stabilizer which produces smoother and more precise operation of the apparatus. This shutter stabilizer, when used in conjunction with the features of driving the shutter and the film feed mechanism from the same drive shaft, aids in producing a higher quality reproduction.

It is still another object of this invention to disclose a synchronizing device which is used when the apparatus is used as a camera for kinerecording. This synchronizer will allow displacement of the video splice, which is formed when the camera reduces 30 frames per second of television transmission to 24 frames per second for commercial photographic use, to a non-critical portion of the picture.

Still a further object is to provide new and improved camera apparatus especially suitable for use in television installations.

Other objects and advantages will become apparent after a consideration of the following description taken in connection with the accompanying drawings, in which:

Fig. 1 is an assembly view of one embodiment of apparatus suitable for practicing the invention;

Fig. 2 is a plan view of the embodiment of apparatus shown in Fig. 1 with a lens mount attached thereto;

Fig. 3 is an enlarged fragmentary sectional view of the gear drive mechanism for the supply and take-up reels of the magazine taken along the lines 3—3 of Fig. 1;

Fig. 4 is a side elevational view of the film threading portion of the apparatus;

Fig. 5 is a side elevational view of the film threading portion of the apparatus as seen from the opposite side from Fig. 4;

Fig. 6 is an additional plan view of the interior of the apparatus of Fig. 2, and in which the case is shown in section;

Fig. 7 is a front elevational view of the shutter and film feeding mechanism according to a preferred embodiment of the invention;

Fig. 8 is a sectional view through the shutter and film feed mechanism with the outer disc removed taken along the line 8—8 of Fig. 10;

Fig. 9 is a rear elevational view taken along the line 9—9 of Fig. 6;

Fig. 10 is a sectional view taken along the lines 10—10 of Fig. 7;

Fig. 11 is a sectional view taken along the lines 11—11 of Fig. 4;

Fig. 12 is a sectional view taken along the line 12—12 of Fig. 5;

Fig. 13 is a fragmentary view of a portion of the gear drive mechanism of the apparatus taken on the line 13—13 of Fig. 6;

Fig. 14 is a sectional view taken along the line 14—14 of Fig. 4;

Fig. 15 is a side elevational view of the film magazine;

Fig. 16 is a front elevational view of the magazine and nose piece showing the film track;

Fig. 19 is a fragmentary view of a portion of the apparatus taken on the line 19—19 of Fig. 16;

Fig. 20 is a sectional view taken along the line 20—20 of Fig. 17;

Fig. 21 is a fragmentary view of the magazine cover latching mechanism taken on the line 21—21 of Fig. 18;

Fig. 22 is an exploded perspective view of a light trap;

Fig. 28 is a schematic diagram of an arrangement for photographing the images on a television tube.

Figure 10A:
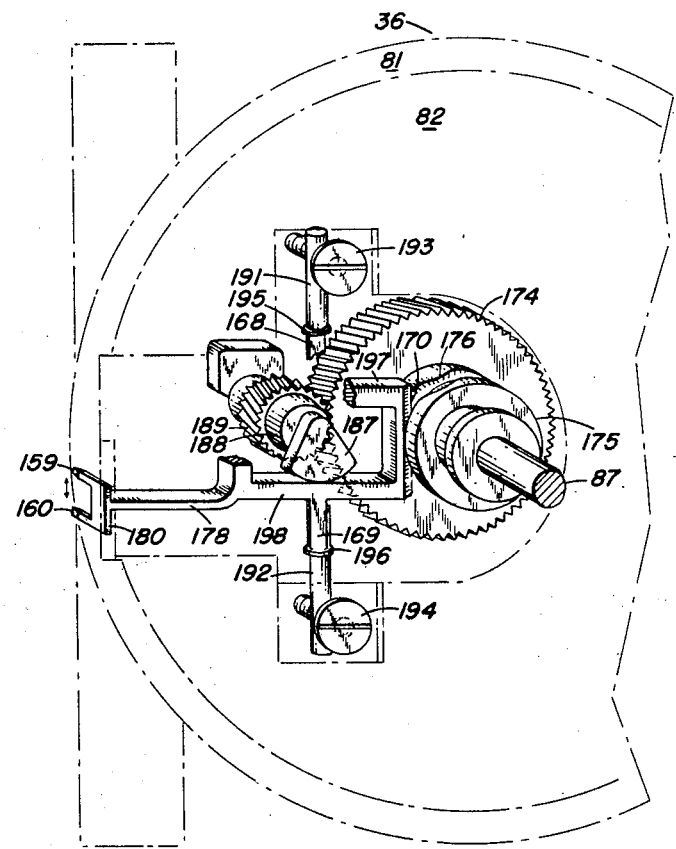
Fig. 10a is a perspective view with parts cut away showing the film feed mechanism.

Referring now to the drawings for a more complete understanding of the invention, in which like reference characters are used throughout to designate like parts, and more particularly to Fig. 2 thereof, there is shown a casing or frame generally designated by the reference numeral 30, and having casing 31. A drive motor 32 of any convenient design may be mounted upon casing 31, as by support 39, having a drive shaft 42 which has secured thereto the gear 497, Fig. 13, which meshes with gear 498 secured to shaft 43, the gears being mounted within the gear housing frame 33. Shaft 43, as will be subsequently more clearly apparent, operates the camera shutter and film feed mechanism and drives the film take-up spool hereinafter to be described. A detachable magazine generally designated by the reference numeral 34 is provided for the film, and manually operated release lever 35 is provided for releasing the magazine 34 from the casing or frame 30, as will be presently more fully explained. The reference numeral 490 indicates a lens mount maintained in position by member 493 and having the lens barrel 491 mounted thereon, which contains a lens of any convenient design and generally designated by the reference numeral 492.

Figure 17:
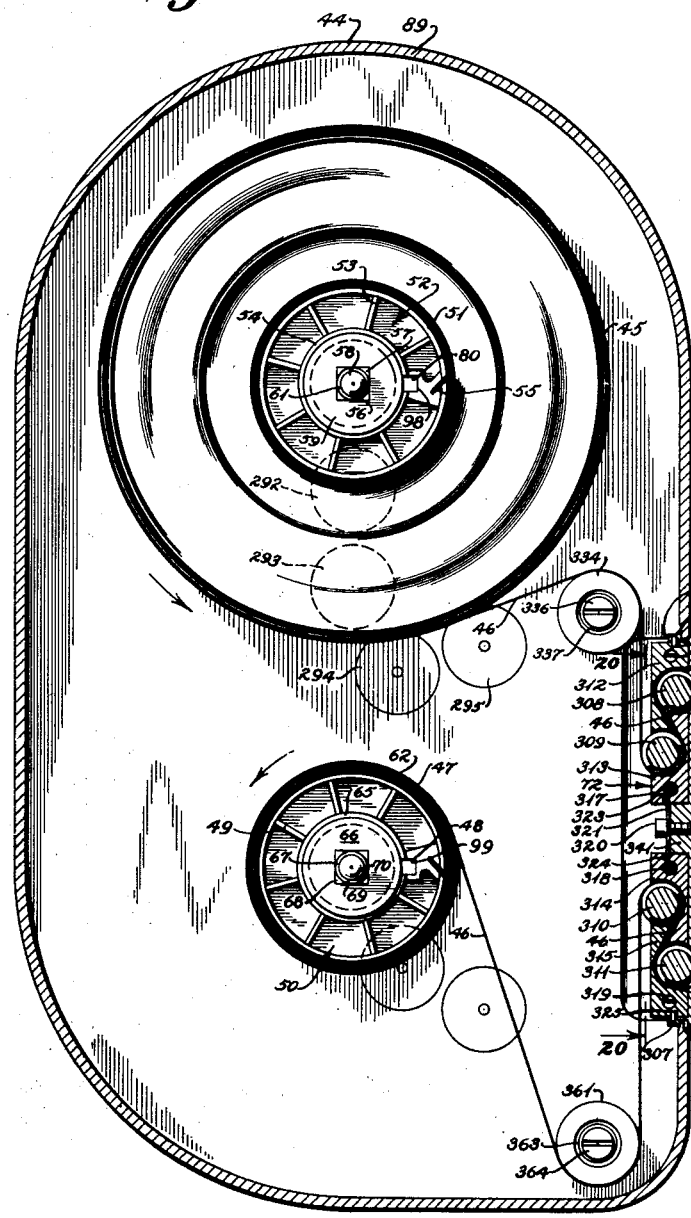
Fig. 17 is a sectional view taken along the line 17—17 of Fig. 16.
Figure 18:
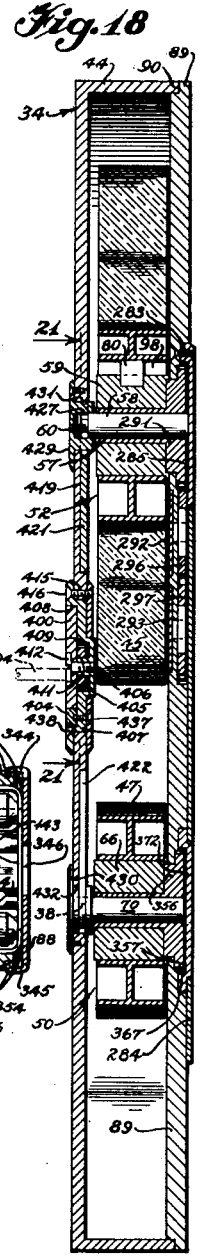
Fig. 18 is a sectional view taken along the line 18—18 of Fig. 15.

Particular reference is made now to Figs. 17 and 18 which are respectively elevational and sectional views of the interior of the film magazine 34. The wall portion 44 of the cover of the magazine has the edge thereof snugly fitting the recess or groove 90 in magazine plate 89 to form a rabbet joint.

The circular post or stud 58 is secured to a thin circular plate 284 which is mounted on the right hand side of magazine plate 89, Fig. 18, and secured thereto as by screws 283. Rotatably mounted upon post or stud 58 is a substantially square sleeve or quill member 57, having circular collar portion 61, and having secured to, or having formed integral therewith, a rotatable plate 291, to which is secured a gear 285 for rotating the member 57 in a manner to be hereinafter described in detail.

Plate inserts or pinion bushings 292, 293, 294 and 295,

Fig. 17, are disposed in apertures in the mounting plate 89 and form supporting means for gears 296, 297, 298 and 299, Fig. 19, which are mounted upon the aforementioned respective plates 89 and 284 on studs (not numbered). The gears and their supporting mechanism are disposed in communicating recesses 301, 302, 303 and 304 respectively, for providing a gear train for driving a spool and reel for supplying or taking up film, as will presently become more clearly apparent.

The aforementioned pedestal member 58 has a reduced shank portion 60 around the periphery thereof, Fig. 18, for providing, in cooperation with a latch member, a catch arrangement for holding the magazine cover in place, as will presently become more clearly apparent.

Mounted upon sleeve or quill 57 is a bushing or sub-spool 59 having pin 80 fixed therein, the bushing 59 having a square bore 56 for receiving the aforementioned quill 57. Mounted upon the bushing or sub-spool 59 is a film reel generally designated 52, having inner and outer rims 54 and 51 respectively, ribs 53, and recess 98 for receiving pin 80. The film 46 is seen, Fig. 17, to have a rolled supply portion 45, mounted upon rim 51. A slit 55 in the reel 52 is provided for attaching the film to the reel.

The film 46 passes, from the supply reel, around guide roller 334, which is mounted upon a shaft fixedly secured to plate 89, the shaft 335 not being shown in Fig. 17, and held in place thereon by screw 336, and having ball bearing 337. Thence the film 46 passes through a light trap, generally designated 72, and comprising adjacent shaped members 312 and 313, which are complementarily shaped and held together by pins 316 and 317, and has mounted therein light trap rollers 308 and 309. Details of the construction of the light trap are shown in Fig. 22. When the light trap is assembled, pin 316 attached to member 313 slides into bore 391 in member 312, and pin 317 slides into a corresponding bore in member 313. The shaft 397 slides into bores 393 and 395, while shaft 396 slides into bores 392 and 394. It can be readily seen that rollers 308 and 309 can either be rotatably mounted on shafts 397 and 396, respectively, or that rollers 308 and 309 may be fixedly mounted on shafts 397 and 396, respectively, shaft 397 then being journalled in bores 393 and 395, and shaft 396 being journalled in bores 392 and 394. The rollers 309 and 308 are observed to have grooves 398 and 399 respectively for assisting in proper tracking of the film. The light trap members 312 and 313 are reversible and interchangeable, and the slots 322 and 323 are so arranged to render the units interchangeable in the mounting.

Figure 27:
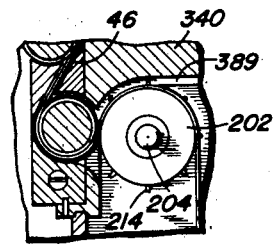
Fig. 27 is an enlarged fragmentary sectional view of the sprocket and light trap mechanism.

The grooves 398 or 399 will be in line with the groove 389 in the nose piece, Fig. 27, so that when the magazine is locked in place the teeth 213 and 214 of sprockets 201 and 202 respectively will project into the grooves, securing the film from jumping the track.

Member 312, Fig. 17, has the aforementioned groove 322 therein for receiving screw 306 threaded through a threaded aperture in rib or lip 332 of a magazine nose piece generally designated 78 and presently to be more fully described. Member 313 also has the aforementioned groove 323 therein for receiving catch member 321 secured to screw 320 which is threaded in the rear portion 341 of the aforementioned nose piece 78. Catch member 321 is secured to screw 320. It can be readily seen from Fig. 20 that as screw 320 is rotated the edges of catch member 321 will either engage or disengage with slots 322 and 323 of light trap members 312 and 313 to secure the light traps in the body portion of the magazine or allow their removal therefrom, respectively.

It is to be noted that the light traps in the magazine are preferably composed entirely of metal, no velvet or other fabric being used. This eliminates the generation of static electric charges, and also discharges any charges that may have accumulated. The traps are removable as a unit and may be disassembled without tools for cleaning. They are symmetrical and, as aforementioned, may be interchanged or turned upside down.

The nose piece 78 has a second lip or rib 333 parallel to the aforementioned rib 332, on three sides thereof, and the edge of the cover is adapted to fit snugly between the two ribs when the cover is in place upon the magazine.

Film 46, after passing through light trap 72 and aperture 342 in nose piece 78, passes through an aperture 344 in nose piece face plate 88, thence along the rear surface of the face plate past aperture 346, and out the aperture 345. The face plate 88 has lips 351 and 354 at the upper and lower extremities thereof, Fig. 17, for engaging the grooves 352 and 353 in nose piece wall portions 339 and 340 respectively, the nose piece face plate being securely held in place thereby, and by screws 387, Fig. 16.

Mounted within the nose piece upon the back wall portion 341, Fig. 17, is a cylinder 327 having base portion 326 and nose 328, which is maintained in engagement with pressure pad 142 by a spring, not shown in Fig. 17, which is contained within cylinder 327. At the lower end of nose piece 78 a second cylinder 330 having base portion 329, and nose 331, is provided, the nose being held against pressure pad 142 by a spring, not shown in Fig. 17, which is within cylinder 330.

The aforementioned nose piece 78 has mounted therein the movable edge guides 143 and 144, which are joined together, as shown, by the cross portion having tab 374 adjacent the aperture 375, through which a side guide actuating spring catch 153, Fig. 4, presses against the tab 374, thereby exerting a slight inward pressure on the arms 143 and 144, as explained more fully hereafter.

In Fig. 20, to which particular reference is now made, is shown a section along the line 20—20 of Fig. 17. The light trap filters in the nose piece are observed to be symmetrically arranged, and both simultaneously releasable by movement of locking screw 320.

In Fig. 16, to which particular reference is now made, is shown a front elevational view of the nose piece 78 with the magazine 34 attached thereto. Grooves 376 and 377 in plate 89 are provided to permit free movement of a pair of gears 223 and 224 respectively, Fig. 4, when the magazine is slidably mounted upon the camera, gears 223 and 224 engaging gears 299 and 371 respectively, selectively in accordance with the direction of movement of the film through the film magazine, in a manner to be presently described in detail.

Apertures 386 and 387 are provided in the nose piece face plate for receiving a pair of fixed edge guides presently to be described, and aperture 288 is provided for permitting free movement of a film claw, presently to be described. The recessed portions 289 and 290 are provided for receiving the aforementioned movable guide edges 143 and 144 respectively.

A side cover 385, Fig. 15, for the nose piece, is held in place by screws 384. The nose piece face plate is held in place by screws 387, Fig. 16, and the nose piece itself is secured to plate 89 by screws 386, Fig. 16, and other screws 390, threaded in the side of plate 89, Fig. 19.

Figure 25:
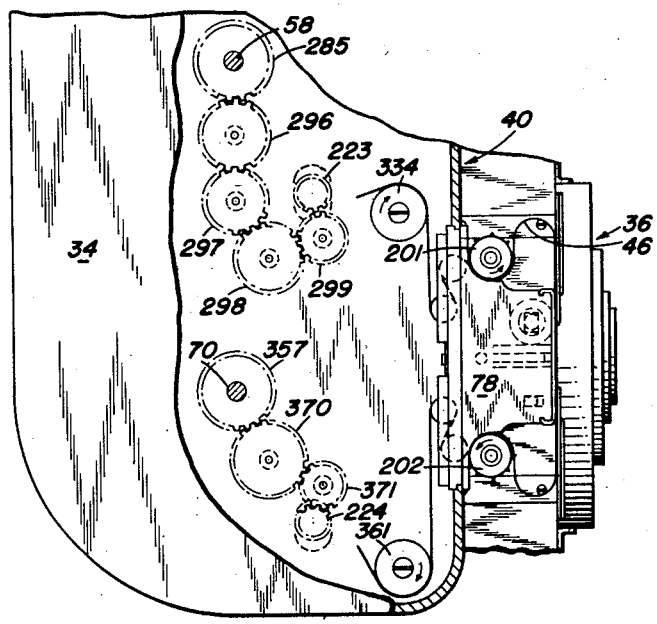
Figure 26:
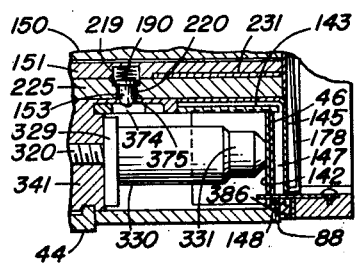
Fig. 26 is a sectional view taken along the line 26—26 of Fig. 25.

Particular reference is made now to Fig. 26, in which the interior of the nose piece is shown in greater detail, Fig. 26 being a cross sectional view taken along the line 26—26 of Fig. 25.

After leaving the nose piece 78, Fig. 17, film 46 passes through a second light trap, which may be substantially identical with the aforedescribed light trap generally designated 72, and comprises rollers 310 and 311, members 314 and 315 held in the desired proximity with each other by pins 318 and 319, and having grooves 324 and 325 respectively, groove 324 receiving aforementioned catch member 321, groove 325 receiving screw 307 in lip portion 332.

After passing around light trap roller 310, film 46 passes thence around roller 361 which is rotatably mounted upon a post 360, Fig. 19, having ball bearing 363 and retaining screw 364, and thence the film passes to the roll of film 47, wound upon outer rim 62 of a take-up film spool generally designated 50, having the ribs 49 and inner rim 65 which has therein the recess 48 for receiving key 99 of a bushing 66 having a substantially square bore 67 therein for receiving a substantially square sleeve member or quill 68 rotatably mounted upon a post 70 which is secured to plate 372; the quill has formed integral therewith the plate 356 and gear 357 for rotating the quill. Gear 357 is mounted within recess 367 in the plate 89, and meshes with a gear train comprising gears 370 and 371 mounted in recesses 368 and 369 respectively, Fig. 19. Cover plate 372, held in place by screws 373 is provided, as shown, the gear train providing means for rotating the film reel 50 in a manner to be hereinafter more fully described.

Fig. 3 may be referred to for an additional view of the gear arrangement for driving the film spools, and the assembly view of Fig. 1 clearly shows the general location of the various gears with respect to each other.

In Figs. 15, 18 and 21 is shown the mechanism for attaching the magazine cover to magazine plate 89. The circular member 400 has a portion of reduced diameter 401, in which are mounted pivoting pins 402 and 403 for handle 404. Formed integrally with or secured to member 400 is the gear 405, members 400 and 405 having centrally disposed aligned apertures 406 therein. Members 400 and 405 are mounted within the large and small circular recesses 408 and 409 respectively of a shaped member 407, which is shaped so that a portion thereof forms a cross portion 410 in which is a centrally located bushing 411 upon which the gear 405 and member 400 rotate. Screw 412 holds the last named gear and member in place when the device is assembled. Member 407 also has formed therein the raised or guide portions 413 and 414 on the rear thereof, for purposes to be subsequently more clearly apparent and forming slots 417 and 418. Member 407 is held in place in aperture 415 in the cover by screws 416, disposed at spaced intervals around the periphery thereof.

The aforementioned grooves 417 and 418 arranged in the back portion of 407 are designed, when the member 407 is in its normal position on the cover to be in alignment with a pair of slanting grooves 419 and 420 respectively cut in the rear of the cover plate.

Slidably mounted within the grooves are a pair of arms 421 and 422, having teeth 423 and 424 respectively for engaging the teeth of gear 405, and having slots 425 and 426 in the ends thereof for engaging the reduced shank portions 69 and 38 respectively of the shafts 58 and 70 respectively upon which the film reels are mounted. Arms 421 and 422 are adapted, by rotary movement of member or handle 404, to engage or disengage the aforementioned hub or shock portions, and selectively catch and release the cover.

The arm 422 is observed, Fig. 21, to have a slot 435 therein, which in connection with the pin 436, limits the movement of the arm to the desired amount. A screw or securing pin 437 is provided, for limiting the movement of handle 404 and preventing the bail 404 from being closed except in a predetermined position in which the magazine is properly locked. Bail 404 has a recess therein which mates with securing pin 437 to lock the cover. The rim of shaped member 407 is observed, Fig. 15, to have a recess or cut away portion 438 to receive the thumb of the operator, to facilitate movement of handle 404.

The end portions of aforementioned posts 58 and 70 are designed to fit in bores 427 and 428 respectively in cap members 429 and 430, which fit in bores 431 and 432 respectively in the cover, and are held in place therein by screws 433 and 434 respectively. The cap or sleeve members 429 and 430 have slots 441 and 442 cut in the sides to receive the ends of the locking members 421 and 422.

In Fig. 19 is shown the rear side of magazine plate 89 from the view shown in Fig. 17, with a cover plate 284 removed to afford a view of the aforedescribed gear trains. Cover plate 284 may conveniently be held on plate 89 by screws 446.

As shown in Fig. 2, the film magazine including the nose piece is adapted to be detachably mounted upon the remainder of the camera. To facilitate this, a groove 381, Fig. 20, having inwardly slanting edges 382 and 383 is provided in the side of nose piece 78, which groove 381 registers with a groove 378, Fig. 19, in the side of plate 89 when the nose piece is secured in place thereon. The groove 378 also has inwardly slanting edges 379 and 380. Grooves 381 and 378 are adapted to receive a properly shaped cross bar 225, Fig. 4, secured to the remainder of the camera, and hold the magazine in place thereon. A magazine latch 155 is provided on the remainder of the camera, Fig. 4, and engages the aperture 447 in the nose piece 78, Fig. 19, for holding the magazine securely in place. The aforementioned aperture 375 is provided in the side of nose piece 78 for receiving a side guide actuating spring member 153, Fig. 4, for exerting a slight sideward or edge pressure on the film 46 in nose piece 78 at the photographing aperture for preventing the film from moving sidewise and thereby providing lateral stability. As the magazine is positioned on the frame of the camera, a point will be reached where member 153 on carriage plate 151 aligns itself with aperture 375 in the nose piece. At this time member 153 will drop into aperture 375 and exert spring pressure on tab 374 of movable side guides 143 and 144, Fig. 17, thereby aligning the film 46 with respect to the exposure aperture of the camera. The aligning of the film as described above occurs immediately prior to the seating of the magazine in the frame, as described more fully hereafter. Cut away 448, Fig. 19, in nose piece 78 is adapted to receive a magazine detent 152, Fig. 4, for preventing the full seating of the magazine until other hereinafter described functions have been performed, and for automatically loosening the magazine when it is unlatched, in a manner to be presently more fully described.

In addition to assisting in the ejection of the magazine when the magazine latch is manually unlatched, the detent 152 and associated mechanism perform other important functions. In assisting in the ejection of the magazine, detent 152 cooperates with recess 448 in the nosepiece. Recess 448, Fig. 19, has a sloping side which detent 152 presses against to give the magazine an initial movement toward the rear of the apparatus. Thereupon the ejector mechanism, which is described more fully hereafter, completes the ejection of the magazine from the main body portion of the apparatus.

The film feed sprockets 201 and 202 serve the function of forming loops in film 46 as the magazine 34 is being mounted on the frame of the apparatus in addition to their function of feeding the film to and from reels 52 and 50 after the magazine is locked in position.

It is desirable to prevent the film feed sprockets 201 and 202, Fig. 4, from fully setting in locked positions until the holes in the film have found seats on the teeth 213 and 214 of the sprockets respectively. Damage to the film would occur should the teeth engage in the film between holes. As the magazine 34 is mounted on carriage plate 151 it will move relative to plate 151 until the nose piece 78 depresses latch 154, Fig. 14, and latch 152 engages aperture 448, at which time the magazine 34 and plate 151 will move as a unit toward the aperture plate of the camera. During the aforementioned relative movement between magazine 34 and plate 151 the aperture in the film 46, by means of its own resiliency, engages the teeth of sprockets 201 and 202. Further movement of magazine 34 and plate 151, as a unit, causes sprockets 201 and 202 to rotate in opposite directions to form loops in film 46. The mechanism by which the loops are formed will be described more fully hereafter. As the magazine sets to the locked position, this aforementioned detent 152, which is spring loaded, depresses allowing the sprockets to lock in operating positions adjacent the nose piece. This operating position is shown in Fig. 27, and is the usual position in which the teeth of a sprocket pass through apertures in a film into a groove in a supporting member, in this instance nose piece 78.

It is also very desirable first to clamp the film flat between the aperture and the pressure or backing plate in order to insure the film lying flat in photographing position. Thereafter, edge pressure may be applied. The edge pressure is applied by using the aforementioned pair of flat hinged arms 143 and 144. The spring pressure is not applied to these arms until hole 375 inside of the nose piece aligns with spring button 153 in the camera magazine carriage, so that pressure from the movable side guides does not occur until the magazine has approached the aperture plate within 1/16" of seated position. It is desirable to hold the magazine back on the carriage until this seating takes place. At this point, the magazine detent 152 depresses, allowing spring button 153 to drop through hole 375 which then applies its spring tension to side guide arms 143 and 144.

Particular reference is made now to Fig. 4. The supporting plate 150 which is fixed on the frame of the apparatus has a pair of laterally extending guide members 161 and 162 secured thereto as by screws 163 and 164 respectively, and having slanting edges 165 and 166 respectively. In the guideways so formed is slidably mounted the magazine carriage plate 151, having a pair of bearing supports 205 and 206 mounted therein and held in place as by screws 207 and 208 respectively, the supports having journalled therein the rotatable shafts 203 and 204 respectively. This pair of shafts 203 and 204 extend through plate 151 and through slots 211 and 212 respectively in plate 150 and have secured thereto a pair of gears, 128 and 253, respectively, Fig. 5, for imparting rotary movement thereto, in a manner to be subsequently more fully explained. Secured to shafts 203 and 204 for rotation therewith are film sprockets 201 and 202 respectively, having sets of sprocket teeth 213 and 214 respectively for engaging the film, in a manner mentioned above and to be subsequently more fully explained.

An additional pair of supporting pedestals, not shown in Fig. 4, and having bases 215 and 216, are mounted in plate 150 for reasons to be subsequently apparent, and are held therein by screws 217 and 218 respectively.

The plate 150 has cut therein a pair of apertures 221 and 222, positioned as shown, through which extend a pair of hub supports, not shown in Fig. 4, having journalled for rotation therein a pair of shafts, 281 and 282, Fig. 5, which have secured thereto for rotation therewith the gears 223 and 224, Fig. 4. These two last named gears 223 and 224 are adapted to selectively mesh with an aforementioned pair of gears 299 and 371 respectively disposed upon the film magazine for operating the supply and take-up film spools while the magazine is mounted in place upon the camera, in a manner to be subsequently more clearly apparent.

A magazine carriage plate lock or detent 154 is provided, disposed within aperture 156 in plate 151, for purposes to be subsequently apparent. Details of the arrangement of detent 154 are shown in Fig. 14.

Disposed substantially centrally of plate 151, Fig. 4, is the aforementioned cross bar member 225, designed to cooperate with an aforementioned guideway on the film magazine, and held securely in place upon plate 151 by screws 228. Mounted within bar member 225 is an aforementioned side guide actuating spring catch 153, and near thereto is mounted a magazine detent mechanism generally designated at 231, held in place by screws 233, and comprising the slot 229, aforementioned magazine detent 152, and spring 230. As briefly mentioned previously, magazine detent 152 cooperates with aperture 448 in the nose piece. When detent 152 falls into aperture 448, plates 151 and magazine 34 slide as a unit until such time as plate 151 reaches the end of its travel whereupon the magazine 34 will travel forward slightly relative to plate 151 as the spring pressure behind detent 152 allows aperture 448 to ride slightly past detent 152. This slight forward movement occurs, as mentioned previously, for the purpose of allowing the pressure plate to flatten the film immediately prior to the application of side pressure to the film.

An aforementioned magazine latch 155 is provided, adapted as aforexplained to cooperate with a suitable aperture 447 in the magazine nose piece 78, for the purpose of locking the magazine to the frame of the apparatus, and is mounted upon base 157 held in place in plate 150 by screws 158. The shank of member 155 comprises a rack portion having teeth therein for engaging the teeth of gear 451 rotating in aperture 452 and secured upon shaft 121 for unlatching the magazine when it is desired to detach the same. Groove 453 is provided for shaft 121, and thumb release 35 may fit over and be secured to member 122.

An aforementioned pair of fixed edge guides 148 and 149 are observed to extend from the film aperture plate 145, and the pull down pins or teeth 159 and 160 are observed extending through a slot in film plate 145.

Particular reference is made now to Figs. 5 and 11 for a more complete understanding of other parts of the invention. As previously mentioned, the supply and take-up spools in the film magazine each have a gear associated therewith, adapted, when the gear is driven, to rotate the associated film spool. The aforementioned drive shaft 87 has secured thereto a gear 95, Fig. 5, having hub portion 96 and set screw 97, and spaced from bearing support 93 by spacer member 94. The gear 95 meshes with a gear 264, Fig. 9 having hub portion 265, gear 264 being secured to shaft 241, Fig. 5, for rotation therewith. Shaft 241 is supported in bearings in a pair of bearing support members 237 and 242, mounted as shown, and has secured to the upper end thereof bevel gear 236 having hub portion 238, and having secured to the lower end portion bevel gear 244 having hub portion 243.

Meshing with aforementioned gear 236 is a bevel gear 235 secured to a shaft 125 for rotation therewith, the shaft 125 being rotatably mounted in bearings in end piece 92 and bearing support 124 secured to plate 150 as by screw 123. The shaft 125 has a portion thereof formed into the worm gear 126.

The aforementioned support member 205, mounted on plate 151, Fig. 4, has a cylindrical casing portion 136, Fig. 11, having secured thereto the collar 129 having the finger 130 formed integral therewith. Finger 130 extends through a slot 132 in a casing 133 secured to plate 150 by member 135 and screws 110, and in which there is disposed the magazine carriage retracting spring 134. It can be seen that as plate 151 with shaft 203 journalled therein moves from right to left in Fig. 5, during the magazine loading operation, that finger 130 compresses spring 134. When latch 155 is released spring 134 causes plate 151 to move from left to right in Fig. 5 thereby assisting in ejecting the magazine from the apparatus.

The reversible drive mechanism will now be described. A second gear 127 is provided, meshing with worm 126, and is rotatably mounted upon a suitable support. Gear 139, Fig. 6, is mounted upon the same axis and is secured to or integral with gear 127 for rotation therewith. Pivotally mounted upon the support for gears 127 and 139, and pivoting about the axis of rotation of these gears 127 and 139, is the flat support member 140, Fig. 5, having centrally mounted thereon along a mutual axis a pair of rotatable gears 118 and 119, Fig. 6. Gear 119 meshes with gear 139, while gear 118 meshes with a gear 109 mounted for rotation upon support 140 in hub or bearing 249, Fig. 11, and secured to shaft 281 for rotation therewith. Shaft 281 passes through aforementioned aperture 221 in plate 150, and has secured thereto to rotate therewith the aforementioned gear 223.

Disposed adjacent the aforementioned lower bevel gear 244, Fig. 5, and meshing therewith is a bevel gear 245 secured to a shaft 246 for rotation therewith, shaft 246 being supported in bearings in members 92 and 251, member 251 being secured to plate 150 as by screw 252. Shaft 246 has a portion thereof formed into the worm gear 247, which has meshing therewith the gear 253 secured to aforementioned shaft 204 for rotation therewith, and also has meshing therewith gear 255 which has on the same axis of rotation gear 266, Fig. 12. The aforementioned plate 216 mounted in plate 150, has the stub shaft 259 formed integral therewith with ball bearings 268, 269, and 270 provided as shown, and retaining screw 280 for maintaining the outer ball bearing in place upon shaft 259. Pivotally mounted for pivotal movement about the shaft 259 is a support member 254, Figs. 5 and 12, having hub portion 258 rotatably mounted in aperture 260, the member 254 having substantially centrally disposed thereon the axially aligned gears 257 and 256. To provide support for the aforementioned gears 257 and 256, the pivoted plate support 254 has mounted in recess 455 therein a plate member 454 having shaft 456 formed integral therewith. Mounted upon shaft 456 is a casing or sleeve member 460, having flange portion 463, and having its other end threaded as shown, member 460 being rotatably mounted upon ball bearings 457 and 458, retaining screw 461 threaded in the end of shaft 456 holding the bearing 458 in place. The aforementioned gear 257 is rotatably mounted upon sleeve 460 as shown, and gear 256 is fixedly mounted on sleeve 460, these gears being separated by the thin washer 210 which is preferably composed of Phosphor bronze or other suitable material for allowing slipping movement between gears 257 and 256. Gear 256 has an aperture 464 therein for receiving a pin 465 attached to the flange portion 459 of a sleeve member 466 mounted upon inner sleeve 460, and secured for rotation therewith by set screw 467 in keyway 468 of sleeve 460, thus effectively securing gear 256 for rotation with sleeve 460. The sleeve member 466 has an outer rim or collar portion 477 upon which is mounted a reversing yoke 131, see Figs. 5 and 12. The spring 261 exerts a pressure on flange 459, and the amount of the tension may be adjusted by changing the position of a cap 262 threaded upon sleeve 460. The gears 256 and 257 accordingly rotate together, with some slippage between them as regulated by the tension of spring 261.

The yoke member 131 has a screw 267 connecting the arms thereof, screw 267 being threaded in one yoke arm and extending through aperture 272 in the other yoke arm, with spring 271, Fig. 5, providing an adjustable tension. Post 273 mounted in plate 150 is provided between the yoke arms, for purposes to be subsequently apparent.

The aforementioned plate 150 has an aforementioned aperture 222 therein through which a hub bearing support 471 formed integral with member 254 extends, Fig. 12. The hub 471 supports shaft 282 in ball bearings 473 and 474, aforementioned gear 224 being secured to one end of shaft 282 for rotation therewith, a gear 263 meshing with aforementioned gear 257 being secured to the other end of shaft 282 by set screw 475 for rotation therewith.

The construction of the above described mechanism is generally similar to the mechanism including gears 127, 130, 119, 118 and 109, except that the threaded sleeve 232 supporting gear 118 and 119 does not have an additional sleeve and yoke mechanism mounted thereon. Spring 120 exerts its pressure against gear 119, Fig. 11.

The aforementioned gears 118 and 119, Fig. 11, are not secured to each other, but may rotate independently of each other. They are separated by a thin gasket 230 preferably made of Phosphor bronze or other suitable material for allowing slipping between them, and are pressed together by spring 120, the tension of which may be adjusted by nut 234 threaded to bearing sleeve 232. This arrangement provides for slippage between gears 118 and 119. In use, the tension of spring 120 is preadjusted in accordance with the type of film to be employed. The gear mechanism for driving the take-up reel has a similar aforedescribed arrangement for permitting slippage.

In normal operation, the mount of film taken per revolution of the take-up reel increases, while the amount of film advanced past the photo aperture per revolution remains constant. The difference must be compensated for by slip in the take-up drive. This mechanism is normally operative only on the take-up, but is incorporated in both feed and take-up ends in case the camera is reversed, in which event the feed reel then becomes the take-up.

Members 140 and 254, Fig. 5, are operatively connected by way of a cross bar 276 slidably mounted in slot or groove 279 in plate 150, member 276 having pins 275 and 277 at the ends thereof for engagement in the slots 274 and 278 respectively in pivotally mounted support members 140 and 254 respectively.

It will be understood that, upon reversal of the direction of rotation of shaft 87, member 276 is moved up or down, Fig. 5, from its former position, with the result that gear 223 or 224, Fig. 4, selectively engages the associated gears of the film magazine respectively depending upon the direction of rotation of the shaft, thereby providing for running the film backward or forward through the camera.

The above described reversing mechanism is responsive only to the direction of rotation of the main drive shaft 87 of the apparatus and does not require additional controls for operation.

The reversing mechanism operates as follows:

Assume that shaft 87 is rotating in one direction and is reversed to rotate in a direction which causes shaft 247, Fig. 5, to drive gear 254 in a clockwise direction, which in turn causes gear 256 to rotate in a counter-clockwise direction which will cause sleeve 460, upon which gear 256 is mounted, to rotate in a counter-clockwise direction. Reversing lever 131 which is slidably mounted on collar 466 which is fixedly secured to sleeve 460 tends to rotate in a counter-clockwise direction, Fig. 5. In this case the lower prong of lever 131 will rotate upward and abut pin 273, which in turn will cause the entire supporting member 254 to tend to rotate in a clockwise direction, Fig. 5, about the shaft upon which gear 255 is mounted. Thus gear 263, and gear 224 which is attached to the same shaft, move downward in Fig. 5. Member 276 is attached to support members 254 and 140 and therefore as support member 254 moves downward and clockwise about the shaft upon which gear 255 is mounted it causes support member 140 to move clockwise about the shaft upon which gear 127 is mounted. Gear 223, mounted on support member 140 will therefore be forced into mesh with gear 299 on the side of the magazine. On the other hand if the direction of rotation of gear 254 is opposite to that described above then gear 224 will be placed into mesh with gear 371, on the magazine, in accordance with the mode of operation discussed above. It can therefore be seen that the direction of rotation of the main drive shaft 87 of the apparatus is the sole factor in determining whether the film will feed in a forward or reverse direction.

Shaft 87, Fig. 11, has the gear 101 secured thereto for rotation therewith, gear 101 meshing with the worm gear 105 on shaft 104 having knob 108, and having synchronizing mechanism generally designated 106 associated therewith. The structure and operation of the synchronizing mechanism will presently be described in detail.

The shutter and film feed mechanism for feeding the film past the shutter of the motion picture apparatus will now be described. It will be noted that a unique mechanical arrangement between the shutter and film feed mechanism is disclosed wherein the linkage between these elements provides for a minimum of backlash and therefore enhances the accuracy of the apparatus. Particular reference is made now to Figs. 7, 8, 10 and 10a, in which are shown views of the shutter and film feed mechanism of the camera apparatus. Drive shaft 87, driven in a manner to be subsequently more fully explained, extends through the bearing 85, Fig. 5, and through bushing 171, Fig. 10, which passes through aperture 167 in the rear portion 84 of housing 83, the bushing 171 having a hub or lip portion 172. Gear 174 is secured to shaft 87 for rotation therewith, and is properly spaced from lip 172 by spacer member 173. Secured to shaft 87 adjacent to gear 174, or formed integral with gear 174, is the rotating cam member 175, having circular groove 176 formed therein. The groove 176 is not uniformly spaced along the longitudinal axis of cam 175, but has a contour for actuation of a follower member, generally designated by the reference numeral 177, Fig. 7, which carries arm 178 having fork portion 180 with claws 159 and 160, Figs. 4 and 9, for providing for film transport. The cam 175 may be of conventional design for providing a 4–1 ratio and the desired pull down movement.

The aforementioned gear 174 meshes with an adjacent gear 189 which is mounted on shaft 188, which is mounted within the frame on mountings not shown. Shaft 188 has an eccentric portion, Fig. 8, which has cam 187 mounted thereon, Fig. 7, or formed integral therewith. The aforementioned follower member, generally designated 177, has a pair of arms 168 and 169 extending from the sides thereof, having clasp portions 195 and 196 respectively adapted to slide freely upon a pair of pins 191 and 192 respectively mounted in grooves 199 and 200 respectively and held in place securely therein by screws 193 and 194 respectively.

In the operation of the aforedescribed cam follower mechanism, inner arm portion 170 of the follower 177 rides in the eccentric groove 176 of cam 175, while the side wall portions 197 and 198 are engaged by cam 187, and cause reciprocating movement of member 177, in a vertical direction as viewed in Fig. 7. This vertical reciprocation causes the fork portion 180 to also reciprocate vertically. The eccentric groove in cam 175 causes the claws of fork 180 to periodically engage and disengage the film. During every fourth downward stroke of arm 178, the claws of fork 180 are engaged with the film. By proper choice of dimensions for the component parts of the mechanism, as will readily be understood by those skilled in the art, an arrangement is provided for imparting the desired time relationship to the translation of the film past the aperture 147.

A shutter member generally designated by the reference numeral 73, Fig. 10, is provided, secured to shaft 87 for rotation therewith, having hub portion 76 separated from cam 175 by spacer member 77, and having a circular disc portion 75 with an extended shutter portion 74, Figs. 7 and 10. A stabilizer 37 is provided, positioned as shown, and having a central portion 183 of reduced thickness, mounted upon the outer race of ball bearing 184 which slides over the outside of the adjacent hub portion of member 73. A cover plate 41 is provided, secured to member 73 in any convenient manner, as by screws 186. A pair of felt washers 181 and 182 are provided, disposed on either side of central portion 183 of stabilizer 37, and damp the movement of the stabilizer, so that it does not rotate too freely upon member 73.

As can be seen from Fig. 10, the only contact between the portion 183 of stabilizer 37 and shutter 73 is through felt pads 181 and 182. Shutter 73 and cover plate 41 do not contact the outer race of ball bearing 184, nor any other portion of the stabilizer except through felt pads 181 and 182.

The purpose of stabilizer 37 is to provide constant speed shutter rotation regardless of change in load conditions imposed on the main power shaft of the apparatus because of the intermittent nature of the film feeding operation and other factors. It can be seen that when shaft 87 is rotating at operating speed, stabilizer 37 acts to give both shaft 87 and the shutter rotation a higher moment of inertia to allow the film feeding and shutter rotation to progress smoothly regardless of changes in load conditions. That is, if for some reason shaft 87 tends to speed up, stabilizer 37 will resist this change; and if shaft 87 tends to slow down, stabilizer 37 will also resist this change. Furthermore, when the shaft 87 is initially started from rest, shutter member 73 can move relative to stabilizer 37, because of the loose connection between them, namely, the felt washers 181 and 182 and the ball bearing 184. Thus in starting of the apparatus the load of the stabilizer is not thrown on the starting motor since the shutter will move relative to the stabilizer. The stabilizer is gradually caused to rotate because of the felt washer connection between it the shutter 73 generate enough friction to bring the stabilizer up to speed gradually. Thus the stabilizer provides the advantage to the shutter and film feed mechanism of providing them with high inertia means for smooth operation after the motion picture apparatus has attained full speed. On the other hand, the stabilizer does not load the motor of the apparatus when it is initially started.

Particular reference is made now to Fig. 28, in which the camera apparatus of Fig. 2 is shown schematically for photographing the image on television tube 494. The synchronizer, generally designated by the reference numeral 106, has the control 108 for adjusting the rotary position of the camera shutter with respect to the position of the drive shaft of motor 32 and thereby bringing the shutter movement into a desired time coincidence with the re-appearance of the images to be photographed on the screen of tube 494. The synchronizer is utilized to move a video splice line, which may be formed on the film, to a non-critical portion of the photograph. More specifically when the apparatus is used for kinerecording according to the method set forth in U. S. Patent 2,251,786, slight inaccuracies and minor fluctuations of shutter speed will cause improper video splicing when there is a reduction of 30 frames per second of television transmission to 24 frames per second for commercial photography uses. This improper splicing results in a bar being formed on the film, which if positioned on a critical portion of the film, will greatly lessen its quality. By the use of the synchronizing mechanism this objectionable bar may be moved to a non-critical portion of the film since the position of the camera shutter is shifted with respect to the portion of the television image being photographed to thereby cause the bar to be formed in a non-critical portion of the photograph.

The synchronizer 106, Fig. 5, may be of conventional design, and may comprise casing 107, cap or cover 117, gear 111 and spacer 115, gear 114 and spacer 116, gear 112, gear 113, and gear 101 cooperating with worm 105 on shaft 104, the rotary position of which is adjusted by aforementioned member 108. The operation of the synchronizer is conventional and need not be described in detail.

In order to load the magazine prior to the mounting thereof on the remainder of the apparatus, the magazine cover is removed and the magazine is loaded by placing a roll or reel of film upon the aforedescribed supply spool means. A length of the film is then passed through light trap 72, around the upper side of nose piece 78, through the upper aperture in the nose piece face plate, past the exposure aperture, through the lower aperture in the face plate, through the lower light trap and thence to the take-up reel. The cover is then placed upon the magazine and latched in place thereon. The film threading operation requires no skill on the part of the person loading the magazine. It is merely necessary for him to insert the film through the aforementioned apertures and around rollers 334 and 361, as described above and shown in Fig. 17, and then attach the film to the take-up reel.

Figure 23A:
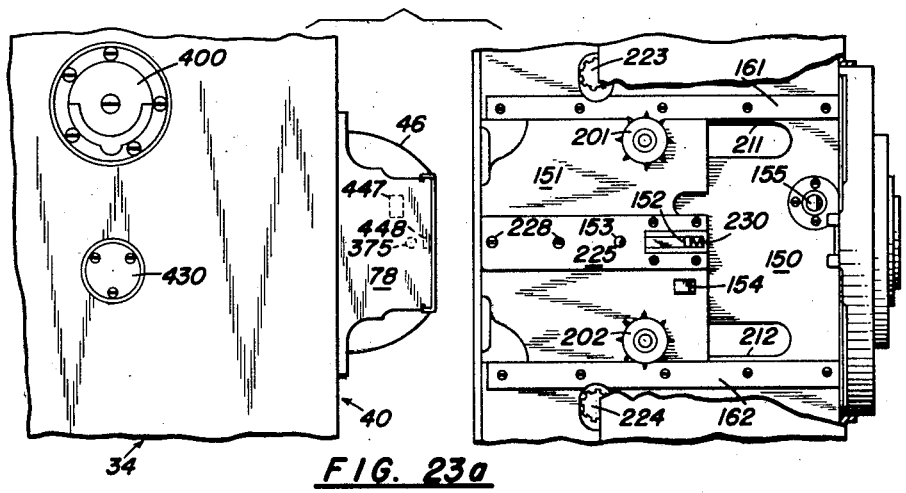
Figs. 23a, 23b, 24a, 24b and 25 are fragmentary views showing the apparatus at various stages in the loading process.
Figure 23B:
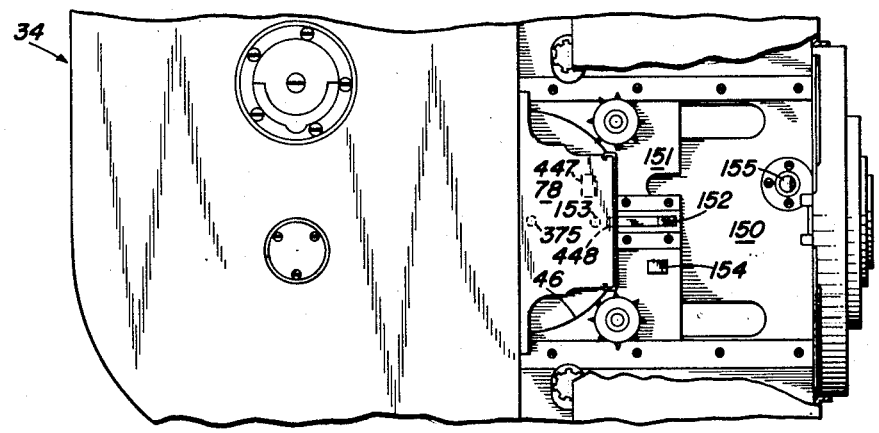
Figure 24A:
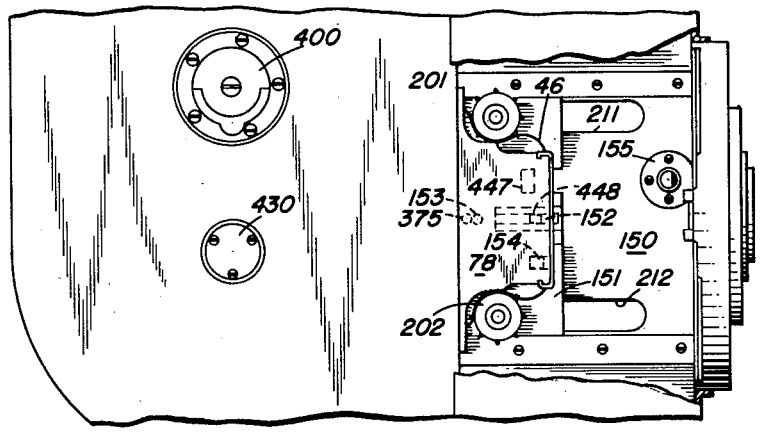
Figure 24B:
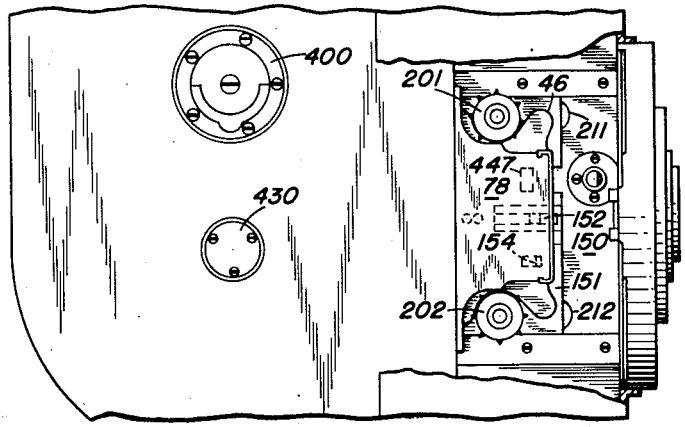

The mode in which the apparatus automatically forms loops during the mounting of the magazine will now be described. Referring to Figs. 23a and 23b, after the magazine 34 has been loaded, as described above, it is slidably mounted upon the magazine carriage plate 151, the aligned grooves 381 and 378 on the nosepiece and side of the magazine, respectively, engaging bar 225 on the carriage plate 151. The magazine assembly (magazine and nose piece) slides relative to the carriage plate 151 until detent 154 on the carriage plate is depressed. The magazine is thus in a loop forming position relative to carriage plate 151. As best seen in Fig. 24a and Fig. 24b, sprockets 201 and 202 are slightly spaced from their respective seats in nose piece 78; otherwise stated, they are not in operating position. During this period of relative movement, the teeth of sprockets 201 and 202 engage the holes in the portion of the film, which are positioned between the light traps and the apertures in the nose piece. After the film has been engaged by the sprockets, magazine latch 152 on the carriage plate 151 engages aperture 448 in the side of the nose piece 78 and causes the carriage plate and the magazine to slide as a unit relative to plate 150 which is affixed to the side of the motion picture apparatus. As mentioned previously, sprockets 201 and 202 are journalled in carriage plate 151 upon one end of shafts 203 and 204, respectively, which have mounted on their other ends gears 128 and 253, respectively, Fig. 5. The gears 128 and 253 are in mesh with worm or spiral gears 126 and 247, respectively. As carriage plate 151 moves toward the aperture plate of the apparatus, that is, from right to left in Fig. 5, gears 126 and 247 act as racks for gears 128 and 253, respectively, thereby causing these latter gears to rotate clockwise and counter-clockwise, respectively. Since sprockets 201 and 202 are affixed to the same shafts as gears 128 and 253, respectively, these sprockets rotate in the same directions as gears 128 and 253. Since the film 46 has been engaged by sprockets 201 and 202 prior to their rotational movement, the rotational movement of the sprockets pulls the film from the reels to form loops in the film, as shown in Fig. 24b.

When the carriage plate has reached the end of its travel, the spring pressed latch 152 depresses and allows the magazine to move forward relative to carriage plate 151 as may be seen in Fig. 25. Side guides 143 and 144 are depressed by detent 153, as described previously, to place side pressure on the film which is then being seated in the aperture plate. As the magazine reaches the end of its travel, latch 155 engages recess 447 in the nose piece and locks the magazine in position on the frame of the apparatus. After the magazine has been locked into position, gear 371 on the magazine engages gear 224 on the frame or gear 299 on the magazine engages gear 223 on the frame, depending on the direction of rotation of the camera driving motor 32, as fully explained above.

The mode of operation of the film driving means, the film reeling means, and the shutter will now be described. After the magazine 34 has been latched to plate 150 of the apparatus, and the loops in the film have been automatically formed, as described above, the apparatus is ready for operation. The reversible drive motor 32, Fig. 1, is energized, and shaft 87, Fig. 5, is caused to rotate. As drive shaft 87 rotates, gear 95 mounted thereon meshes with gear 264 which is mounted on shaft 241, Fig. 9, bevel gears 236 and 244, which are mounted on shaft 241, mesh with gears 235 and 245, respectively. The latter gears are affixed to shafts 125 and 246 which have a portion thereof formed into worm or spiral gears 126 and 247 respectively, Fig. 5. Gears 128 and 253 mesh with gears 126 and 247, respectively. As described previously, the translation of gears 128 and 253 relative to gears 126 and 247 causes these gears to rotate in opposite directions to cause the sprockets attached to the same shafts as these gears to form loops in the film. However, the sprockets 201 and 202 are caused to rotate in the same direction, Fig. 4, after they have formed loops in the film and thereby serve the additional function of feeding the film to and from the take up reels of the magazine. Shafts 125 and 246 rotate in opposite directions, as is evident from the linkage as set forth in Fig. 5. But since gear 128 is mounted below shaft 126 and gear 253 is mounted above gear 247, these gears, and therefore the sprockets, are caused to rotate in the same direction to effect the feeding of the film to the take up reel and from the supply reel.

The shutter member 73 operates as follows:

An inspection of Figs. 10 and 10a discloses that shutter 73 is mounted directly on an extension of shaft 87. Because of this arrangement no gearing is required to link the drive shaft 87 and the shutter member 73. The shutter member consists of an extended portion 74 which periodically closes aperture 147 during the course of rotation of the shutter member, Fig. 7, for the purpose of allowing a new portion of film to be positioned in the exposure aperture. The portion 82 of the shutter member consists of an aperture which allows exposure of the film positioned in exposure aperture 147. The stabilizer member 183 and its function have been described above and will not be described again at the present time.

While the extended portion 74 of the shutter blocks the exposure aperture a new frame of film is inserted into the exposure aperture of the apparatus. This is brought about as follows: Cam 175, Figs. 10 and 10a, has a groove 176 positioned thereon which is irregularly disposed along the longitudinal axis of the cam. Cam follower 177 has a portion 170, Fig. 7, which rides in groove 176. The cam follower 177 is pivoted about the axis of pins 191 and 192. Film claw 180 which is fixed to follower 177 by means of arm 178 is caused to periodically pivot about the axis of pins 191 and 192 to periodically engage the film. Cam 187, Fig. 8, is eccentrically mounted on shaft 188, as described above, and rides within the aperture formed by portions 197 and 198 of follower 177. The eccentric movement of cam 187 causes cam follower 177 to reciprocate in a vertical direction. Thus it can be seen that a combination of motions is applied to cam follower 177 by cams 175 and 187. This combination of motions causes the film claw 180 to move up and down in Fig. 7 and into and out of the plane described by the sheet upon which Fig. 7 is printed. In this manner the claw periodically engages the film, while extended portion 74 closes exposure aperture 147, and thereby provides a new frame of film for exposure. It can be seen that the film feeding mechanism thus described operates almost directly from the main drive shaft of the apparatus with a minimum of gearing, thus eliminating the backlash and other inherent drawbacks of complex gearing arrangements.

Whereas the invention has been shown and described with reference to camera apparatus, it is clear that the automatic loop setting and other features thereof may also be used in projector apparatus.

It is apparent then, that the aforedescribed apparatus is eminently qualified and suitable to fulfill the objects of the invention. Whereas in prior art devices loading or threading film into a motion picture camera is accomplished by a series of manual steps with the accompanying human errors and variables, in the subject motion picture apparatus this threading and loading is accomplished by simultaneous automatic mechanical means. All the operations are precise, there being no substantial variables. There is also a considerable saving in time.

It is also possible to load the apparatus embodying the subject invention under difficult conditions, where it would be impossible to use a manually loaded camera, such for example as conditions of extreme cold, where the operator would have to wear heavy gloves, and also under conditions where there is insufficient light at the camera to see by clearly.

As aforementioned, the top and bottom film loops are automatically set or formed when the magazine is loaded into the camera. These loops are of uniform size. Also, the aforementioned film edge guides at the photographic aperture do not close on the film until the film is lightly clamped between the pressure pad and the photographic aperture plate; this eliminates any possible buckling of the film at this point.

As aforementioned, the film spindles in the magazine are supported at both ends, eliminating possible bending or misalignment should the magazine be bumped or dropped while a heavy roll of film is on the spindle.

The aforementioned cover may be removed and replaced with one hand by a twist of an aforementioned button having a folding bale. The cover is self-guiding, and, as aforementioned, locked in place upon the magazine by sliding forked bolts which fit into annular grooves on the end of film support spindles which do not themselves rotate. The film spools ride on quill shafts which rotate on these spindles.

The magazine slides into the camera on a substantial dove-tail strip which guides and precisely locates it at the photographic aperture, where it is locked during operation. If at any time, when or before the film in the magazine has been entirely exposed, it is desired to remove it, this may be done by pressing the release lever. This allows the magazine to be ejected by a spring, and thereafter a new magazine may be substituted.

As is well known in the art, when a camera is used for studio work, a reverse film take up is desirable, since it is desirable that the camera run backwards.

In the camera of the subject invention, this is accomplished by a device which automatically disengages the bottom or take-up spool and engages the top or supply spool. This device is so constructed and arranged that it does not load the mechanism when the camera is speeded up, but on the contrary, the faster the camera is run, the less the drag, so that the film convolutions are uniformly snug, and no damage to the film can occur.

As is well known in the art, when a camera is used for photographing an image on a television oscilloscope, an extremely long exposure is desired, which means that ways must be found to transport film past the photo aperture in the shortest possible time. Some prior art cameras do this by varying the velocity of the pull-down claws, and this means varying the velocity of the cam shaft that operates the claws. The half cycle on the pull-down is very fast and the half cycle on the retake is slowed down. When this is done, it is impossible to drive the exposure shutter off the camera drive mechanism, but a separate motor of the synchronous type must be employed to drive the shutter, and also the camera, and an elaborate starting coupling must be employed. In the camera embodying the instant invention, all shafts turn at constant velocity. The high speed pull-down is accomplished by driving the pull-down claws at three times normal speed, but causing the claws to enter perforations and advance film only once every fourth down-stroke.

As is well known, in television photography the shutter opening is critical within plus or minus ½ degree, so that all shutter back-lash must be eliminated. The camera of the instant invention is constructed and arranged so that there are no gears between the shutter and exposure timing shaft, and to further insure that this shaft runs as smoothly as possible, a stabilizer is mounted on the shaft.

As is well known, prior art motion picture cameras become inoperative at very low temperatures. The camera of the instant invention is constructed and arranged so that shrinkage of the frame tends to loosen the bearings. Preferably ball bearings are used throughout. There are no bronze-to-steel running parts, so that there is no temperature shrinkage difference in any running or rotating part.

It is further noted that the mechanism is built on its own chassis. There are no running parts on the case. The case provides a cover only, and may be removed and replaced without affecting alignment of the mechanism.

It is especially to be noted that while the magazine is being mounted, the members 126 and 247 are not rotated, and act as racks which engage gears 128 and 253 causing them to turn in opposite directions; once the magazine is mounted and the driving power applied to shaft 87, members 126 and 247 act as worms, rotating gears 128 and 253 in the same direction.

The purpose of first rotating the sprockets in opposite directions is to withdraw sufficient film both from top and bottom rolls in the magazine to supply sufficient slack from which to form the top and bottom loops. In the photographing operation, these same sprockets rotate in the same direction, one withdrawing film from the supply roll in the magazine, the other feeding it back into the magazine to the take-up or storage roll.

As is well known in the art, in making motion pictures from the face of a television tube, it is frequently desirable to change the synchronized locked position of the shutter in the camera, in relation to the flying spot which paints the television image on the tube. Provision has been made for this in the instant camera. An aforementioned differential gearing is placed between the drive motor 32 and the main drive shaft. Should it be desired to advance or retard the camera relative to the television tube, this may be accomplished by rotating a control 108. Control 108 may be a manually operable thumb screw, or may be motor driven from a suitable control motor. This rotates the differential cage which alters the timing without stopping the camera.

Whereas a film feed mechanism having a 4–1 pull-down ratio has been described, it will be understood that any multiple ratio may be used. A 3–1 ratio, for example, is also suitable.

Any suitable source, not shown, may be employed for energizing the drive motor 32.

Obviously many modifications and variations of the present invention are possible in the light of the above teachings. It is therefore to be understood that within the scope of the appended claims the invention may be practiced otherwise than as specifically described.

This invention may be manufactured and used by or for the Government of the United States of America for governmental purposes without the payment of any royalties thereon or therefor.

What is claimed as new and desired to be secured by Letters Patent of the United States is:

1. In motion picture apparatus of the character disclosed for use with a supply of film, in combination, magazine means including a nose piece and supply and take-up spools for said film, a portion of the film supply within said magazine means being arranged to extend between said spools and around said nose piece, frame means, said magazine means being arranged to be detachably mounted upon said frame means by moving said magazine slidably into engagement with said frame means until said magazine reaches a predetermined fixed position upon said frame means, a plate slidably supported on said frame means, a pair of rotatable film driving sprocket means carried by said plate for engaging the film adjacent the nose piece as said magazine means is slidably mounted upon said frame means, each of said sprocket means including a gear enmeshed with a rack means mounted on said frame means, said plate being slidable with said magazine means along said frame means so that the sprockets carried by said plate rotate in opposite directions to form a pair of loops in the film on opposite sides of the nose piece, drive means, gear means selectively connecting said drive means and one of said spools after the magazine means is mounted upon the frame so that the spool connected to said drive means is driven by said drive means, gear means operatively connecting said drive means and each of the sprocket means so that both sprocket means may be rotated in the same direction by said drive means after the magazine means is mounted upon said frame means.

2. Apparatus according to claim 1 including, in addition, lens means and shutter means mounted upon said frame means adjacent said nose piece, means for moving said film past said lens means, and means operatively connecting said shutter means and said drive means for operating said shutter means in synchronism with the movement of said film past said lens means.

3. In motion picture apparatus of the character disclosed for use with a supply of film, in combination, frame means, magazine means including a nose piece and having a supply of film disposed therein with a portion of said film extending around said nose piece, a plate means slidably mounted upon said frame, a securing means mounted on said frame means for locking said magazine means in a fixed position on said frame means, said magazine means being arranged to be detachably mounted upon said frame means by slidably engaging said plate means and moving slidably with said plate means until said securing means locks said magazine means in position on said frame means, first and second film driving sprockets rotatably mounted on said plate means and having first and second gears secured thereto respectively, third and fourth gears of the spiral type mounted on said frame means so that they extend in the direction that the plate means slides and arranged to mesh with said first and second gears respectively, the teeth of said sprockets engaging the film as the magazine means slidably engages the plate means, said sprockets being rotated in opposite directions during the relative movement of said plate means and said frame means to form a pair of loops in the film, and drive means operatively connected to said third and fourth gears for driving these gears and the sprockets connected thereto in the same direction after said magazine means is locked in position on said frame means.

4. Apparatus according to claim 3 including, in addition, film supply and take-up spools mounted in said magazine means, first and second gear means operatively connected to said supply and take-up spools respectively for rotating the same, and means also selectively interconnecting said drive means and one of said first and second gear means to rotate one of the spools while the magazine is locked in position on said frame means.

5. Apparatus according to claim 4 wherein said drive means is additionally characterized as being reversible and includes means for simultaneously rotating said first and second gears in two directions in accordance with the direction of rotation of the drive means.

6. In motion picture apparatus of the character disclosed for use with a supply of film having a row of spaced apertures therein, in combination, frame means including a first plate, a film aperture plate mounted on said first plate, a magazine carriage plate slidably mounted on said first plate, magazine means including a second plate, first and second film spools rotatably mounted upon said second plate, first and second gear means operatively connected to said first and second film spools respectively for rotating the same, a nose piece attached to said second plate, movable film side edge guides in said nose piece, said nose piece including a nose piece face plate having an exposure aperture and two slots therein, said film extending from said first spool around one side of said nose piece through one slot of said face plate past the exposure aperture, through the other slot, around the other side of said nose piece to said second spool, said nose piece including a pressure pad, said first plate having a pair of substantially parallel elongated slots therein, a pair of shafts rotatably mounted upon said magazine carriage plate and extending through said pair of elongated slots respectively, a pair of sprockets secured to adjacent ends of said pair of shafts respectively, each of said sprockets having teeth at spaced intervals around the periphery thereof, a pair of gears secured to the other ends of said pair of shafts respectively, said magazine means being slidably mounted upon said magazine carriage plate with the nose piece between said sprockets, gear means for rotating said sprockets in opposite directions when the magazine carriage plate moves with respect to said first plate, the teeth in said pair of sprockets being engaged with the apertures in said film as the sprockets rotate, means on said magazine carriage plate for preventing movement of the said magazine carriage plate with respect to said first plate until the nose piece of said magazine means has moved a predetermined distance between said pair of sprockets, means mounted upon said magazine carriage plate for exerting side pressure on said movable side guides when the magazine means and magazine carriage plate have moved substantially to said film aperture plate, and automatically operated latching means for latching said magazine means and magazine carriage plate in positions whereat said nose piece face plate is substantially adjacent said film aperture plate.

7. An automatic loop forming arrangement for a motion picture apparatus comprising a frame, a plate slidably mounted on said frame, a magazine having a length of film protruding therefrom adapted to be slidably mounted on said plate, sprocket means rotatably mounted on said plate, first detent means mounted relative to said plate and frame for holding said plate in one position relative to said frame as said magazine is slidably mounted on said plate, said detent being released by said magazine when said magazine reaches a predetermined position on said plate, second detent means mounted relative to said magazine and plate for causing said magazine and plate to slide as a unit relative to said frame, said film engaging said sprocket means during the relative movement of said magazine and plate, means mounted on said frame for causing said sprocket means to rotate as the plate and magazine move as a unit relative to the frame to thereby form a loop in said film, and locking means for locking said magazine relative to said frame after the magazine is fully mounted on said frame.

8. An automatic lop forming arrangement for a motion picture apparatus comprising a frame, a plate movably mounted on said frame, a magazine containing a supply of film adapted to be mounted on said plate, a nose piece affixed to said magazine, said film extending from said magazine and around said nose piece, sprocket means rotatably mounted on said plate and spaced apart for said nose piece to pass closely therebetween, said sprocket means engaging said film on either side of said nose piece as said magazine is being mounted on said plate, first detent means for holding said plate in one position relative to said frame as said magazine is mounted on said plate, said detent being released when said magazine reaches a predetermined position on said plate, second detent means mounted relative to said magazine and plate for causing said magazine and plate to move as a unit relative to said frame, and means mounted on said frame for causing said sprocket means to rotate in opposite directions as the plate and magazine move as a unit relative to said frame for forming loops in said film extending from said magazine.

9. An automatic loop forming arrangement as set forth in claim 8 including locking means for locking said magazine relative to said frame after the magazine is fully mounted on said frame.

10. The apparatus of claim 8, and further comprising a film edge guide mounted on said nose piece, and third detent means adapted to apply pressure to said film edge guide immediately prior to full seating of the magazine on the frame.

11. An automatic loop forming and film feeding arrangement for a motion picture apparatus comprising a frame, a plate slidably mounted on said frame, a magazine adapted to be slidably mounted on said plate, film supply and take-up reels mounted within said magazine, a nose piece affixed to said magazine, a supply of film having spaced feeding apertures therein and being coiled on said reels and extending around said nose piece, a plurality of sprocket shafts rotatably mounted on said plate, sprockets mounted on corresponding ends of said shafts, first gears mounted on the other ends of said shafts, said sprockets engaging said spaced apertures in said film as said magazine is slidably mounted on said plate, worm gears mounted in said frame and in mesh with said first gears, said magazine and plate travelling as a unit relative to said frame and said first gears mounted on said shafts on said plate thereby being caused to travel relative to said worm gears whereby said first gears are caused to rotate in opposite directions to form loops in said film as said magazine is being mounted on said frame, drive means mounted on said frame, gear means connecting said drive means to said worm gears which are in mesh with said first gears to cause said first gears to rotate in the same direction and thereby cause said sprockets to rotate in the same direction when said drive means are in operation to thereby assist in the feeding of the film.

12. In motion picture apparatus of the character disclosed for use with a supply of film, in combination, frame means including a first plate, an aperture plate mounted on said frame means, shutter means mounted on said frame means adjacent said aperture plate, said first plate having first and second substantially parallel slots therein, said first plate having first and second apertures therein, said frame means including a magazine carriage plate slidably mounted upon said first plate, first and second shafts journalled in said magazine carriage plate, said first and second shafts extending through said first and second slots, respectively, first and second gears secured to the ends of said first and second shafts respectively adjacent said first plate, first and second sprockets secured to the ends of said first and second shafts respectively adjacent said magazine carriage plate, each of said sprockets having teeth at spaced intervals around the periphery thereof, first and second worm gears mounted on said first plate substantially parallel to said first and second slots respectively, said first and second gears meshing with said first and second worm gears respectively and providing an arrangement for rotating said first and second sprockets in opposite directions while said magazine carriage plate is slidably moved with respect to said first plate, first and second hub means pivotally mounted upon said first plate and extending through said first and second apertures respectively, third and fourth shafts journalled in said first and second hub means respectively, said third and fourth shafts having third and fourth gears secured thereto on the ends respectively on the side of said first plate adjacent said magazine carriage plate and fifth and sixth gears secured thereto on the respective other ends, drive means connected to said first and second worm gears for rotating them in opposite directions, first gear means operatively connecting said first and second worm gears to said fifth and sixth gears respectively for rotating the latter and thereby rotating said third and fourth gears in the same direction, said first gear means including means for pivotally moving said first and second hub means in said first and second apertures and thereby moving said third and fourth gears simultaneously to first and second positions selectively in accordance with the direction of rotation of said drive means, detachable magazine means including a second plate adapted to be slidably mounted upon said magazine carriage plate, film supply and take-up reels rotatably mounted upon said second plate, second and third gear means operatively connected to said film supply and take-up reels respectively for rotating the same, said second and third gear means including a pair of additional gears rotatably mounted upon said second plate and adapted after the magazine means is mounted upon the frame means to be selectively engaged with said third and fourth gears respectively in accordance with the direction of rotation of the drive means, a nose piece secured to said second plate, movable film side guides in said nose piece, said nose piece having side walls each of which comprises a relatively thin portion followed by a relatively thick portion, said nose piece including a nose piece face plate having an exposure aperture and slots therein, said supply of film extending from said supply spool around one side of said nose piece through the adjacent slot of said face plate past the exposure aperture, through the other slot, around the other side of said nose piece to said take-up spool, the teeth of said sprockets being engaged with the apertures in said film as the sprockets rotate in response to sliding movement of the magazine carriage plate while the magazine means is being mounted upon the frame means thereby forming loops in the film adjacent the sides of the nose piece, means on said magazine carriage plate for preventing movement of said last named plate with respect to said first plate until the nose piece of said magazine means has moved a predetermined distance between said first and second spindles and the spindles are substantially adjacent the thick portions of the said walls, means including a detent mounted upon said carriage plate for exerting side pressure on said movable side guides when the nose piece has moved to a position where it is substantially adjacent said aperture plate, and manually releasable latching means for latching said magazine means and magazine carriage plate in positions whereat said nose piece face plate is substantially adjacent said aperture plate.

13. In motion picture apparatus of the character disclosed for use with a supply of film, in combination, frame means including a first plate, an aperture plate mounted on said frame means, shutter means mounted on said frame means adjacent said aperture plate, said first plate having first and second substantially parallel slots therein, said first plate having first and second apertures therein, said frame means including a magazine carriage plate slidably mounted upon said first plate, first and second shafts journalled in said magazine carriage plate, said first and second shafts extending through said first and second slots respectively, first and second gears secured to the ends of said first and second shafts respectively adjacent said first plate, first and second sprockets secured to the ends of said first and second shafts respectively adjacent said magazine carriage plate, each of said sprockets having teeth at spaced intervals around the periphery thereof, first and second worm gears mounted on said first plate substantially parallel to said first and second slots respectively, said first and second gears meshing with said first and second worm gears respectively and providing an arrangement for rotating said first and second sprockets in opposite directions while said magazine carriage plate is slidably moved with respect to said first plate, first and second hub means pivotally mounted upon said first plate and extending through said first and second apertures respectively, third and fourth shafts journalled in said first and second hub means respectively, said third and fourth shafts having third and fourth gears secured thereto on the ends respectively on the side of said first plate adjacent said magazine carriage plate and fifth and sixth gears secured thereon on the respective other ends, drive means connected to said first and second worm gears for rotating them in opposite directions, first gear means operatively connecting said first and second worm gears to said fifth and sixth gears respectively for rotating the latter and thereby rotating said third and fourth gears in the same direction, said first gear means including means for pivotally moving said first and second hub means in said first and second apertures and thereby moving said third and fourth gears simultaneously to first and second positions selectively in accordance with the direction of rotation of said drive means, detachable magazine means including a second plate adapted to be slidably mounted upon said magazine carriage plate, film supply and take-up spools rotatably mounted upon said second plate, second and third gear means operatively connected to said film supply and take-up spools respectively for rotating the same, said second and third gear means including a pair of additional gears rotatably mounted upon said second plate and adapted after the magazine means is mounted upon the frame means to be selectively engaged with said third and fourth gears respectively in accordance with the direction of rotation of the drive means, a nose piece secured to said second plate, said nose piece having side walls each of which comprises a relatively thin portion followed by a relatively thick portion, said supply of film extending from said supply spool around one side of said nose piece and thence around the other side of said nose piece to said take-up spool, the teeth of said sprockets being engaged with the apertures in said film as the sprockets rotate in response to sliding movement of the magazine carriage plate while the magazine means is being mounted upon the frame means thereby forming loops in the film adjacent the sides of the nose piece, means on said magazine carriage plate for preventing movement of the said last named plate with respect to said first plate until the nose piece of said magazine means has moved a predetermined distance between said first and second sprockets and the sprockets are substantially adjacent the thick portions of said walls, and manually unlatchable latching means for latching said magazine means and magazine carriage plate in positions whereat said nose piece is substantially adjacent said aperture plate.

14. In motion picture apparatus of the character disclosed for use with a supply of film, in combination, frame means including a first plate, said first plate having first and second substantially parallel slots therein, said first plate having first and second apertures therein, said frame means including a magazine carriage plate slidably mounted upon said first plate, first and second shafts journalled in said magazine carriage plate, said first and second shafts extending through said first and second slots respectively, first and second gears secured to the ends of said first and second shafts respectively adjacent said first plate, first and second sprockets secured to the ends of said first and second shafts respectively adjacent said magazine carriage plate, each of said sprockets having teeth at spaced intervals around the periphery thereof, first and second worm gears mounted on said first plate substantially parallel to said first and second slots respectively, said first and second gears meshing with said first and second worm gears respectively and providing an arrangement for rotating said first and second sprockets in opposite directions while said magazine carriage plate is slidably moved with respect to said first plate, first and second hub means pivotally mounted upon said first plate and extending through said first and second apertures respectively, third and fourth shafts journalled in said first and second hub means respectively, said third and fourth shafts having third and fourth gears secured thereon on the ends respectively on the side of said first plate adjacent said magazine carriage plate and fifth and sixth gears secured thereto on the respective other ends, drive means connected to said first and second worm gears for rotating them in opposite directions, first gear means operatively connecting said first and second worm gears to said fifth and sixth gears respectively for rotating the latter and thereby rotating said third and fourth gears in the same direction, said first gear means including means for pivotally moving said first and second hub means in said first and second apertures and thereby moving said third and fourth gears simultaneously to first and second positions selectively in accordance with the direction of rotation of said drive means, detachable magazine means including a second plate adapted to be slidably mounted upon said magazine carriage plate, film supply and take-up spools rotatably mounted upon said second plate, second and third gear means operatively connected to said film supply and take-up spools respectively for rotating the same, said second and third gear means adapted after the magazine means is mounted upon the frame means to be effectively selectively engaged by said third and fourth gears respectively in accordance with the direction of rotation of the drive means, a nose piece secured to said second plate, said supply of film extending from said supply spool around one side of said nose piece and thence around the other side of said nose piece to said take-up spool, the teeth of said sprockets being engaged with the apertures in said film as the sprockets rotate in response to sliding movement of the magazine carriage plate while the magazine means is being mounted upon the frame means thereby forming loops in the film adjacent the sides of the nose piece, and means on said magazine carriage plate for preventing movement of said carriage plate with respect to said first plate until the nose piece of said magazine means has moved a predetermined distance between said first and second sprockets.

15. In motion picture apparatus of the character disclosed for use with a supply of film, in combination, frame means including a first plate, said first plate having first and second substantially parallel slots therein, said first plate having first and second apertures therein, said frame means including a magazine carriage plate slidably mounted upon said first plate, first and second shafts journalled is said magazine carriage plate, said first and second shafts extending through said first and second slots respectively, first and second gears secured to the ends of said first and second shafts respectively adjacent said first plate, first and second sprockets secured to the ends of said first and second shafts respectively adjacent said magazine carriage plate, each of said sprockets having teeth at spaced intervals around the periphery thereof, first and second worm gears mounted on said first plate substantially parallel to said first and second slots respectively, said first and second gears meshing with said first and second worm gears respectively and providing an arrangement for rotating said first and second sprockets in opposite directions while said magazine carriage plate is slidably moved with respect to said first plate, first and second hub means pivotally mounted upon said first plate and extending through said first and second apertures respectively, third and fourth shafts journalled in said first and second hub means respectively, said third and fourth shafts having third and fourth gears secured thereon on the ends respectively on the side of said first plate adjacent said magazine carriage plate and fifth and sixth gears secured thereto on the respective other ends, drive means connected to said first and second worm gears for rotating them in opposite directions, first gear means operatively connected to said fifth and sixth gears for rotating said third and fourth gears in the same direction, said fifth and sixth gears being operatively connected to said first and second worm gears, respectively, said first gear means including means for pivotally moving said first and second hub means in said first and second apertures and thereby moving said third and fourth gears simultaneously to first and second positions selectively in accordance with the direction of rotation of said drive means, detachable magazine means including a second plate adapted to be slidably mounted upon said magazine carriage plate, film supply and take-up spools rotatably mounted upon said second plate, second and third gear means operatively connected to said film supply and take-up spools respectively for rotating the same, said second and third gear means rotatably mounted upon said second plate and adapted after the magazine means is mounted upon the frame means to be effectively selectively engaged by said third and fourth gears respectively in accordance with the direction of rotation of the drive means, and a nose piece secured to said second plate, said supply of film extending from said supply spool around one side of said nose piece and thence around the other side of said nose piece to said take-up spool, the teeth of said sprockets being engaged with the apertures in said film as the sprockets rotate in response to sliding movement of the magazine carriage plate while the magazine means is being mounted upon the frame means thereby forming loops in the film adjacent the sides of the nose piece.

16. In motion picture apparatus employing movable film, in combination, a frame, carriage means slidably mounted on said frame, a pair of spaced sprockets rotatable carried by said carriage means for automatically forming a pair of loops in said film, a pair of spiral members located between said sprockets, a pair of gear means each connected to one of said sprockets for rotation therewith and operatively connecting said pair of rotatable sprockets to said pair of spiral members respectively, said spiral members forming racks for rotating said sprockets in opposite directions to form said loops as said sprockets are moved simultaneously in the same direction along their respective spiral gears with said carriage means, drive means connected to said spiral members, said spiral members also forming worm gears operative when driven to rotate said sprockets in the same direction to advance said film.

17. In motion picture apparatus of the character disclosed for use with a supply of film, in combination, a magazine including a casing having at least one aperture therein and having a supply of film therein, means secured to said casing forming a nose piece for the film, said film extending through said aperture and around said nose piece, a first plate having first and second sprocket means rotatably mounted thereon each of which includes a film driving sprocket, a second plate, said first plate being slidably mounted upon said second plate, said second plate having first and second substantially parallel slots therein through which said first and second sprocket means extend respectively, sprocket driving means mounted upon said second plate and disposed adjacent to the respective slots therein, magazine securing means mounted upon said second plate and arranged to engage said casing to lock the magazine in fixed relation to said second plate, said casing being arranged to slidably engage said first plate and to slide with said first plate relative to said second plate into engagement with said securing means, said film driving sprockets being disposed on either side of said nose piece for engaging the film extending from said aperture as said casing slidably engages said first plate, said sprockets rotating in opposite directions as the first plate slides relative to the second plate to form a pair of loops in said film on opposite sides of said nose piece, drive means, gear means including said sprocket driving means interconnecting said drive means and said first and second sprocket means for rotating said film driving sprockets in the same direction after the magazine casing has been locked in a fixed position relative to said second plate.

18. Apparatus according to claim 17 including, in addition, shutter means mounted on said second plate, and additional gear means operatively connecting said drive means and said shutter means.

19. An automatic loop forming arrangement for a motion picture apparatus comprising a frame, carriage means slidably mounted on said frame, a magazine containing a supply of film, an intermediate portion of film extending from said magazine, means on said magazine and carriage means to slidably mount said magazine on said carriage means, roller means rotatably carried by said carriage means for engaging said intermediate portion of film during the mounting of said magazine on said carriage means, and means carried by said frame to rotate said roller means during sliding movement of said carriage means and magazine to form a loop in said intermediate film portion.

20. The apparatus of claim 19 wherein said magazine comprises supply and take-up reels and reel gears operatively connected thereto, said latter mentioned means comprises worm gears, drive means on said frame operatively connected to said worm gears, and reversing means on said frame interposed between said drive means and said reel gears for selectively engaging said reel gears and thereby causing each reel, when engaged, to rotate in an opposite direction from the other reel, when engaged.

21. An arrangement as set forth in claim 20 wherein said reversing means comprises a reversing gear in mesh with one of said worm gears, reel gear driving gears selectively engageable with said reel gears, means on said frame operatively positioned relative to said reversing gear and reel gear driving gears for causing selective engagement of said reel gear driving gears with a corresponding reel gear depending solely upon the direction of rotation of said drive means, and means connected between said worm gears and said reel gear driving gears for causing rotation of the reel gear driving gears.

22. An arrangement as set forth in claim 21 wherein said means operatively positioned relative to said reversing gear and reel gear driving gears for causing selective engagement of said reel gear driving gears with said reel gears comprises a first shaft mounted on said frame, said reversing gear rotatably mounted on said first shaft, a hub member pivotally mounted on said first shaft for relative rotary movement with respect to said reversing gear, a second shaft mounted on said hub member, gear means in mesh with said reversing gear mounted on said second shaft and interposed between said reversing gear and one of said reel gear driving gears, said last mentioned gear means being rotatably mounted on said hub member, a collar member fixed to said gear means and rotatably mounted on said second shaft and interposed between said second shaft and said gear means, and lever means operatively engaging said collar member for causing said reel gear driving gears to selectively engage a corresponding reel gear depending on the direction of rotation of said drive means.

23. An arrangement as set forth in claim 22 in which said lever means comprises a brake frictionally engaging said collar member, post means mounted on said frame for engagement with said brake, a second hub member pivotally mounted on said frame, one of said reel gear driving gears mounted on said second hub member, and a link member connecting said first and second hub members whereby when said brake causes pivotal movement of said first hub member a pivotal movement is caused in the second hub member to thereby selectively cause one of said reel gear driving gears to engage its corresponding reel gear.

24. An automatic loop forming arrangement for a motion picture apparatus comprising a frame including a film aperture plate, carriage means slidably mounted on said frame, a magazine containing a supply of film and having a nose piece including a nose piece face plate, an intermediate portion of film extending from said magazine and around said nose piece, means on said magazine and carriage means to slidably mount said magazine on said carriage means, roller means rotatably carried by said carriage means on both sides of said nose piece for engaging said intermediate portion of film during the mounting of said magazine on said carriage means, worm gear means carried by said frame to rotate said roller means during sliding movement of said carriage means and magazine to form a pair of loops in said intermediate film portion, means for latching the magazine means to said frame means with the nose piece adjacent the film aperture plate, and drive means operatively connected to said worm gear means for rotating said roller means after the magazine means is latched to said frame means.

25. An automatic loop forming arrangement for a motion picture apparatus comprising a frame having a lens with a lens axis, a plate movably mounted on said frame for movement towards said lens, a magazine, means slidably mounting said magazine on said plate for movement towards said lens, film supply and take-up reels mounted within said magazine, a nose piece affixed to said magazine and lying on said lens axis when said magazine is mounted on said plate, a supply of film having spaced feeding apertures therein coiled on said reels and extending from said magazine and around said nose piece, a pair of sprocket shafts rotatably mounted on said plate and extending therethrough, sprockets mounted on the ends of said shafts on the magazine side of said plate, said shafts lying on opposite sides of said lens axis and spaced apart for said nose piece to pass betweeen said sprockets, first detent means for holding said plate relative to said frame as said magazine is mounted on said plate, whereby said nose piece and the extending film will pass between said sprockets and apertures of the film will engage teeth of the sprockets under the resilient urging of the film, means to release said first detent means when said magazine reaches a predetermined position on said plate, second detent means mounted relative to said magazine and plate for causing said magazine and plate to move as a unit relative to said frame and positioned to be engaged upon release of said first detent means, and means on said frame for causing said sprockets to rotate in opposite directions as the plate and magazine move as a unit relative to said frame for forming loops in said film extending from said magazine.

26. An automatic loop forming arrangement for a motion picture apparatus comprising a frame having a lens with a lens axis, a plate movably mounted on said frame for movement towards said lens, a magazine, means slidably mounting said magazine on said plate for movement towards said lens, film supply and take-up reels mounted within said magazine, a nose piece affixed to said magazine and lying on said lens axis when said magazine is mounted on said plate, a supply of film having spaced feeding apertures therein coiled on said reels and extending from said magazine and around said nose piece, a pair of sprocket shafts rotatably mounted on said plate and extending therethrough, sprockets mounted on the ends of said shafts on the magazine side of said plate, said shafts lying on opposite sides of said lens axis and spaced apart for said nose piece to pass between said sprockets, first detent means for holding said plate relative to said frame as said magazine is mounted on said plate, whereby said nose piece and the extending film will pass between said sprockets and apertures of the film will engage teeth of the sprockets under the resilient urging of the film, means to release said first detent means when said magazine reaches a predetermined position on said plate, second detent means mounted relative to said magazine and plate for causing said magazine and plate to move as a unit relative to said frame and positioned to be engaged upon release of said first detent means, said sprockets being out of operating position with respect to said nose piece when said second detent means are engaged, means mounted on said frame for causing said sprocket means to rotate in opposite directions as the plate and the magazine move as a unit relative to said frame for forming loops in said film extending from said magazine, means on said frame to stop the movement of said plate towards said lens, said second detent means being yieldable to permit movement of said magazine towards said lens after said plate is stopped, and lock means on said frame engaging said magazine when said magazine is in its forward position, said sprocket being in operating position relative to said nose piece when said lock means is engaged.

References Cited in the file of this patent

UNITED STATES PATENTS

| | | |
|---|---|---|
| 1,108,122 | Blair | Aug. 25, 1914 |
| 1,196,063 | Wooden | Aug. 29, 1916 |
| 1,637,378 | Howell | Aug. 2, 1927 |
| 1,691,414 | Thornton | Nov. 13, 1928 |
| 1,714,461 | Chanier et al. | May 21, 1929 |
| 1,792,436 | Mery | Feb. 10, 1931 |
| 1,797,175 | Mueller | Mar. 17, 1931 |
| 1,815,693 | De Madaler | July 21, 1931 |
| 1,863,066 | Owens | June 14, 1932 |
| 1,865,107 | Howell | June 28, 1932 |
| 1,920,967 | Carpenter | Aug. 8, 1933 |
| 1,933,562 | Michel | Nov. 7, 1933 |
| 1,975,336 | Stechbart | Oct. 2, 1934 |
| 1,979,800 | Howell | Nov. 6, 1934 |
| 2,007,214 | Proctor | July 9, 1935 |
| 2,008,033 | Nystrom | July 16, 1935 |
| 2,105,628 | Becker | Jan. 18, 1938 |
| 2,275,498 | Berndt | Mar. 10, 1942 |
| 2,327,857 | Bolsey | Aug. 24, 1943 |
| 2,408,549 | Brueske | Oct. 1, 1946 |
| 2,472,143 | Briskin | June 7, 1949 |
| 2,568,734 | Heyer | Sept. 25, 1951 |